(12) United States Patent
Marcouiller et al.

(10) Patent No.: US 10,101,543 B2
(45) Date of Patent: Oct. 16, 2018

(54) INDEXING TERMINALS FOR SUPPORTING A BIDIRECTIONAL INDEXING ARCHITECTURE

(71) Applicant: CommScope Technologies LLC, Hickory, NC (US)

(72) Inventors: Thomas Marcouiller, Shakopee, MN (US); Oscar Fernando Bran de León, Belle Plaine, MN (US); Thomas G. LeBlanc, Westminster, MA (US); Todd Loeffelholz, Bellingham, WA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/707,427

(22) Filed: Sep. 18, 2017

(65) Prior Publication Data

US 2018/0088287 A1    Mar. 29, 2018

Related U.S. Application Data

(63) Continuation of application No. 14/752,142, filed on Jun. 26, 2015, now Pat. No. 9,766,414.

(60) Provisional application No. 62/107,697, filed on Jan. 26, 2015, provisional application No. 62/018,220, filed on Jun. 27, 2014.

(51) Int. Cl.
*G02B 6/38* (2006.01)
*G02B 6/44* (2006.01)

(52) U.S. Cl.
CPC ......... *G02B 6/3879* (2013.01); *G02B 6/3825* (2013.01); *G02B 6/4471* (2013.01)

(58) Field of Classification Search
CPC ... G02B 6/3879; G02B 6/4471–6/4475; G02B 6/3825
See application file for complete search history.

(56) References Cited

U.S. PATENT DOCUMENTS

| | | |
|---|---|---|
| 7,264,402 B2 | 9/2007 | Theuerkorn et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |

(Continued)

FOREIGN PATENT DOCUMENTS

| | | |
|---|---|---|
| AU | 2011201287 A1 | 4/2011 |
| EP | 1 981 185 A1 | 10/2008 |

(Continued)

OTHER PUBLICATIONS

Extended European Search Report for Application No. 15811416.5 dated Dec. 5, 2017.

(Continued)

*Primary Examiner* — Jerry Rahll
(74) *Attorney, Agent, or Firm* — Merchant & Gould P.C.

(57) ABSTRACT

Aspects of the present disclosure relates to an indexing terminal including a multi-fiber ruggedized de-mateable connection location, a first single-fiber ruggedized de-mateable connection location and a second single-fiber ruggedized de-mateable connection location. The multi-fiber ruggedized de-mateable connection location includes a plurality of fiber positions with one of the fiber positions optically coupled to the first single fiber ruggedized de-mateable connection location.

24 Claims, 30 Drawing Sheets

(56) References Cited

U.S. PATENT DOCUMENTS

| | | |
|---|---|---|
| 7,959,361 B2 | 6/2011 | Lu et al. |
| 9,348,096 B2 | 5/2016 | Kmit et al. |
| 9,766,414 B2 | 9/2017 | Marcouiller et al. |
| 2006/0093278 A1 | 5/2006 | Elkins, II et al. |
| 2009/0238531 A1 | 9/2009 | Holmberg et al. |
| 2009/0310916 A1 | 12/2009 | Luther et al. |
| 2010/0092129 A1 | 4/2010 | Conner |
| 2010/0284662 A1 | 11/2010 | Reagan et al. |
| 2014/0133810 A1* | 5/2014 | Schneider ............ G02B 6/3885 385/89 |

FOREIGN PATENT DOCUMENTS

| | | |
|---|---|---|
| JP | 10-32545 A | 2/1998 |
| JP | 2009-38650 | 2/2009 |
| WO | WO 2013/149150 A1 | 10/2013 |

OTHER PUBLICATIONS

International Search Report and Written Opinion for Application No. PCT/US2015/038054 dated Oct. 6, 2015.

* cited by examiner

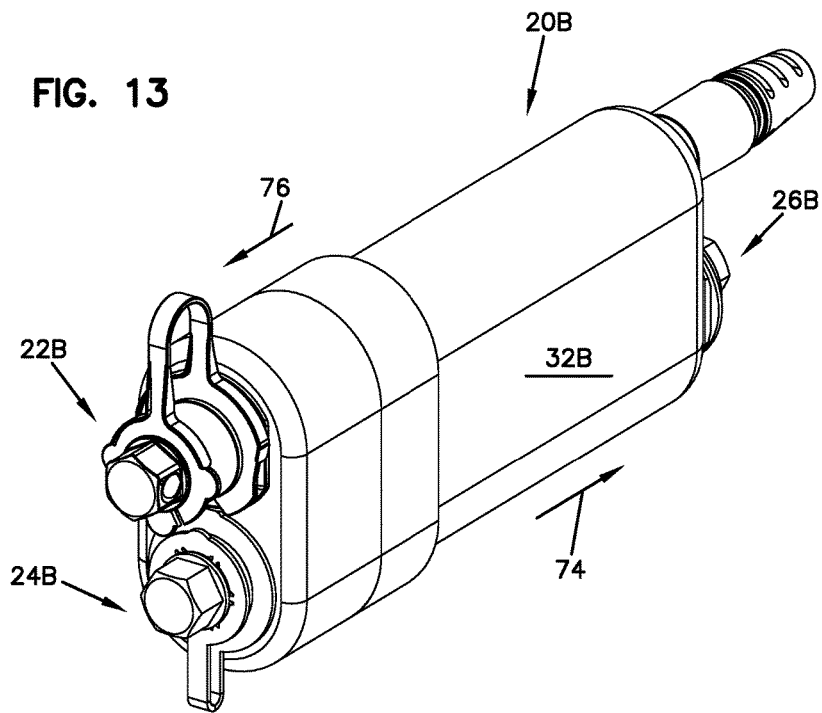
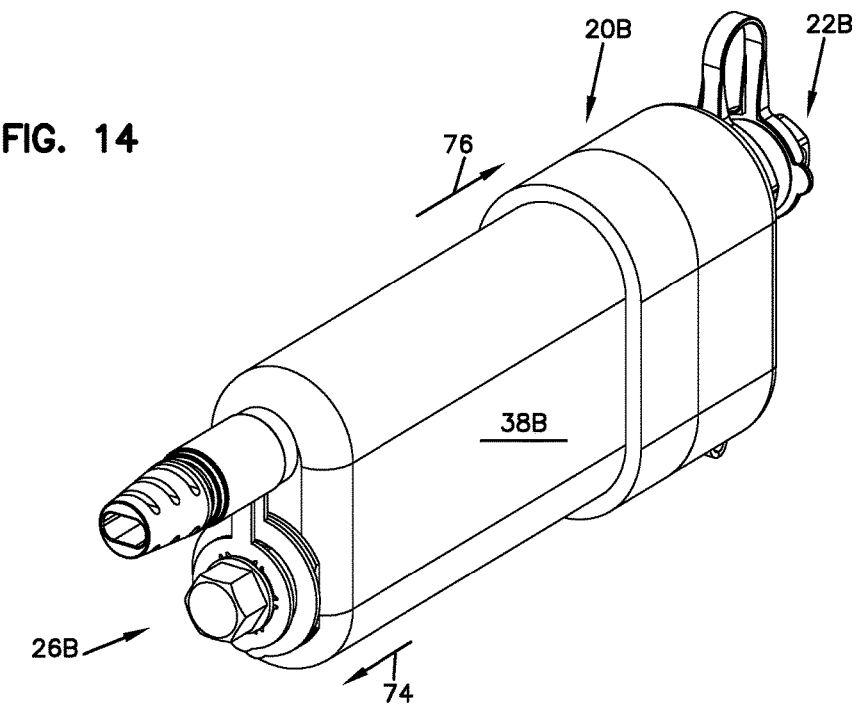

INDEXING TERMINALS FOR SUPPORTING A BIDIRECTIONAL INDEXING ARCHITECTURE

CROSS REFERENCE TO RELATED APPLICATIONS

This application is a continuation of application Ser. No. 14/752,142, filed Jun. 26, 2015, now U.S. Pat. No. 9,766, 414, which application claims the benefit of provisional application Ser. No. 62/018,220, filed Jun. 27, 2014, and titled "Indexing Terminals for Supporting a Bidirectional indexing architecture," and provisional application Ser. No. 62/107,697, filed Jan. 26, 2015, and titled "Indexing Terminals for Supporting a Bidirectional indexing architecture," which applications are incorporated herein by reference in their entirety.

TECHNICAL FIELD

The present disclosure relates generally to equipment for fiber optic communications networks. More particularly, the present disclosure relates to the components of passive optical networks and methods for deploying the same.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Aspects of the present disclosure relate to indexing terminal configurations suitable for facilitating the efficient and cost effective installation of fiber optic networks incorporating bidirectional indexing architectures. Certain teachings of the present disclosure relate to ruggedized indexing terminals having low profiles suitable for installation at narrow deployment sites such as within a trench. Other teachings of the present disclosure relate to ruggedized indexing terminals suitable for outdoor use having port schemes that facilitate daisy-chaining multiple indexing terminals together while concurrently facilitating branching drop lines from the terminals.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 13 is a right perspective view of another indexing terminal housing in accordance with the principles of the present disclosure;

FIG. 14 is a left perspective view of FIG. 13;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
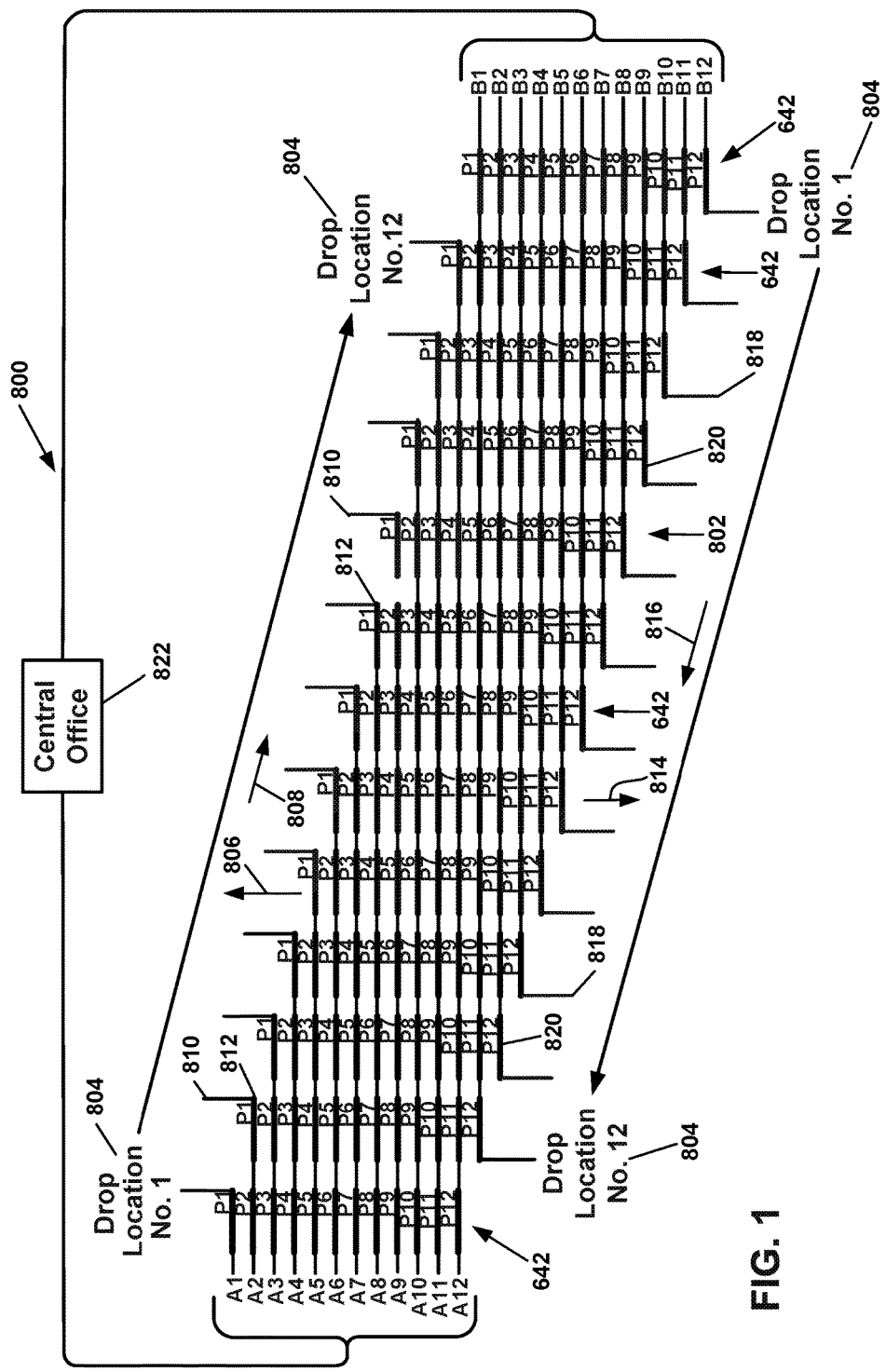
FIG. 1 is a schematic of a modified fiber distribution line where signal travel is bi-directional used in systems in accordance with the principles of the present disclosure.

FIG. 1 illustrates a fiber optic network 800 that incorporates an example bidirectional indexing architecture 800 that can be efficiently deployed using indexing terminals in accordance with the principles of the present disclosure. The bidirectional architecture assists in maximizing the capacity of the network and/or for providing redundant lines to given drop locations.

Referring to FIG. 1, the fiber optic network architecture 800 includes first fiber optic lines A1-A12 and second fiber optic lines B1-B12 routed at least partially along a route 802 that extends past a plurality of drop locations 804. The fiber optic network architecture 800 also includes a plurality of multi-fiber optical connectors 642 (e.g., HMFOC connectors) positioned along the route 802. The fiber optic lines A1-A12 and B1-B12 extend through the multi-fiber optical connectors 642. The multi-fiber optical connectors 642 each have a plurality of consecutive fiber positions P1-P12 for receiving optical fibers corresponding to the fiber optic lines A1-A12 and B1-B12.

The fiber optic lines A1-A12 are indexed in a first indexing direction 806 along the consecutive fiber positions P1-P12 of the multi-fiber optical connectors 642 as the fiber optic lines A1-A12 extend in a first route direction 808 along the route 802. The fiber optic lines A1-A12 are progressively dropped from the route 802 to subscriber connection points 810 at the drop locations 804 by progressively indexing the fiber optic lines A1-A12 to one of the consecutive fiber positions P1-P12 that is a first predetermined drop position 812 (e.g., P1).

The fiber optic lines B1-B12 are indexed in a second indexing direction 814 along the consecutive fiber positions P1-P12 as the fiber optic lines B1-B12 extend in a second route direction 816 along the route 702. The optical fiber lines B1-B12 are progressively dropped from the route 802 to subscriber connection points 818 at the drop locations 804 by progressively indexing the fiber optic lines to another of the consecutive fiber positions P1-P12 that is a second predetermined drop position 820 (e.g., P12). The second predetermined drop position 820 is a different one of the consecutive fiber positions P1-P12 as compared to the first predetermined drop position 812. Also, the first indexing direction 806 is opposite from the second indexing direction 814. Moreover, the first route direction 808 is opposite from the second route direction 816.

It will be appreciated that the architecture 800 is depicted schematically and that additional multi-fiber optical connectors (e.g., HMFOC connectors) can be added into the architecture 800. Additionally, single fiber optical ports such as ruggedized fiber optic adapters can be provided at the subscriber connection points 810, 818. Moreover, various indexing terminals can be strung serially together in a daisy chain to form the architecture 800.

In the depicted embodiment, the multi-fiber optical connectors 642 are 12-fiber optical connectors. In other examples, the multi-fiber optical connectors 642 can include at least 4, 6, 8, 12, 24 or more optical fibers.

Referring back to FIG. 1, the first optical lines A1-A12 and the second optical lines B1-B12 extend to a common location such as a central office 822. In this way, the optical fiber lines A1-A12 and the optical fiber lines B1-B12 cooperate to form a fiber loop.

As the terms are used herein, ruggedized optical connectors and ruggedized optical adapters are configured to mate together to form an environmental seal. Some non-limiting example ruggedized optical connector interfaces suitable for use with an indexing terminal are disclosed in U.S. Pat. Nos. 7,744,288, 7,762,726, 7,744,286, 7,942,590, and 7,959,361, the disclosures of which are hereby incorporated herein by reference.

Figure 5:
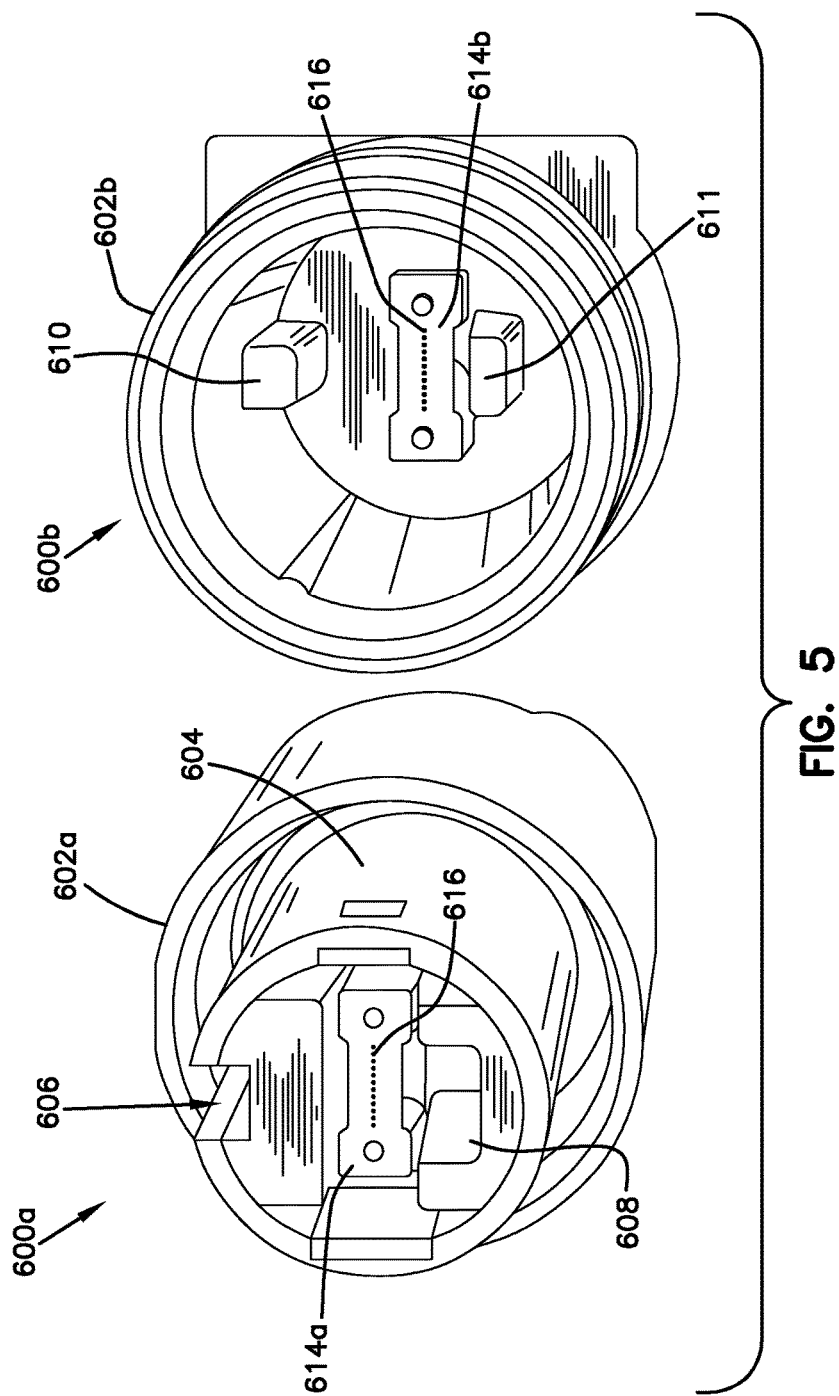
FIG. 5 is a perspective view of ruggedized multi-fiber connectors that can be used in systems and components of the present disclosure.
Figure 6:
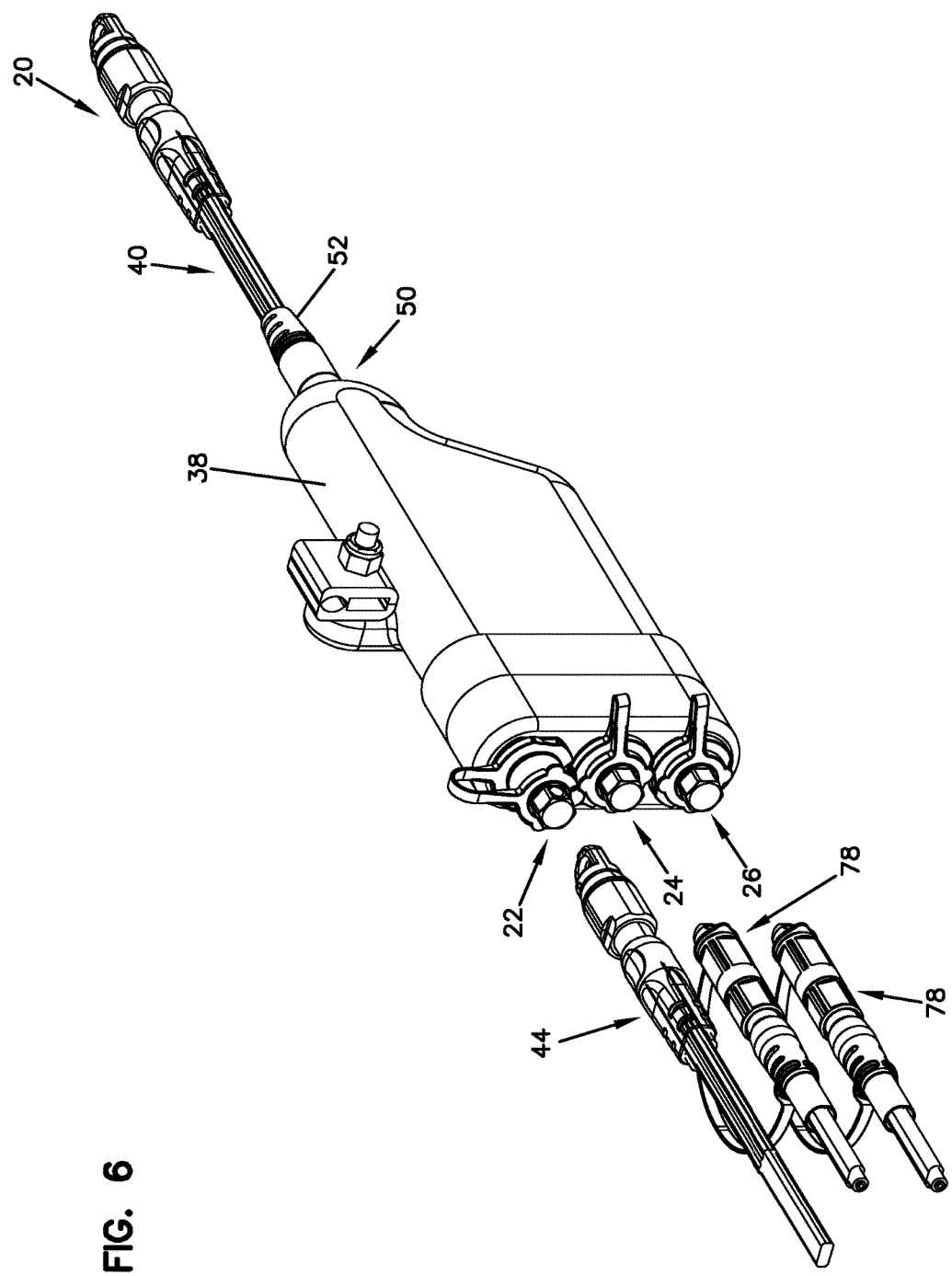
FIG. 6 is a right perspective view of an indexing terminal housing with dust caps on and corresponding cables in accordance with the principles of the present disclosure.
Figure 7:
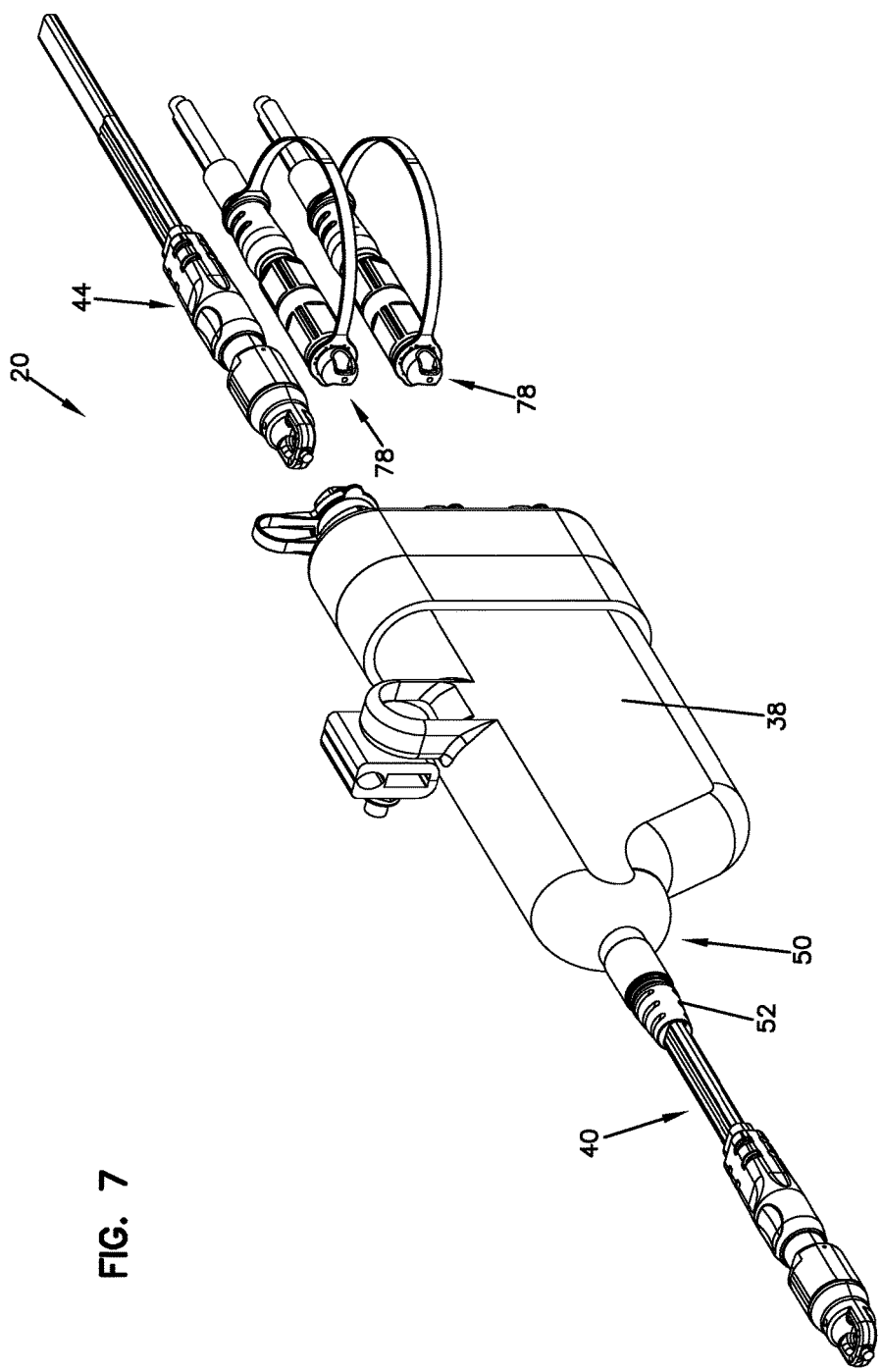
FIG. 7 is a left perspective view of FIG. 6.

The terminals can include hardened/ruggedized multi-fiber optical connectors (HMFOC). HMFOC's can include environmental seals for sealing the connectors in outside environments. HMFOC's can include fasteners such as threaded or bayonet-style fasteners for providing robust connector-to connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions. FIG. 5 shows example mating male and female HMFOC connectors 600a, 600b. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 of the female connector 600b to provide alignment during coupling. The connectors 600a, 600b include ferrules 614a, 614b having fiber receiving arrangements that include fiber receiving positions 616 (e.g., a row of twelve fiber receiving positions) that align when the connectors 600a, 600b are mated to provide optical connections between the optical fiber supported by the ferrules 614a, 614b. Further details of example HMFOC connectors are disclosed at U.S. Pat. No. 7,264,402, which is hereby incorporated by reference in its entirety.

The terminals can also include hardened single fiber connectors (DLX). Hardened single fiber connectors can include environmental seals for sealing the connectors in outside environments. Hardened single fiber connectors can include fasteners such as threaded fasteners for providing robust connector-to connector mechanical connections. Hardened single fiber connectors can include male connectors on cables, female connectors on cables, ports/adapters on housings and other structures. Hardened single fiber connectors can include ferrules supporting single fibers. Further details about example hardened single fiber connectors and adapters are disclosed at U.S. Pat. No. 7,959,361, which is hereby incorporated by reference in its entirety.

The terminals can also include non-ruggedized connectors such as standard single fiber connectors (e.g., SC plugs, SC adapters, LC plugs, LC adapters, ST plugs, ST adapters, etc.) or standard multi-fiber connectors (e.g., MPO plugs and/or MPO adapters).

Figure 2:
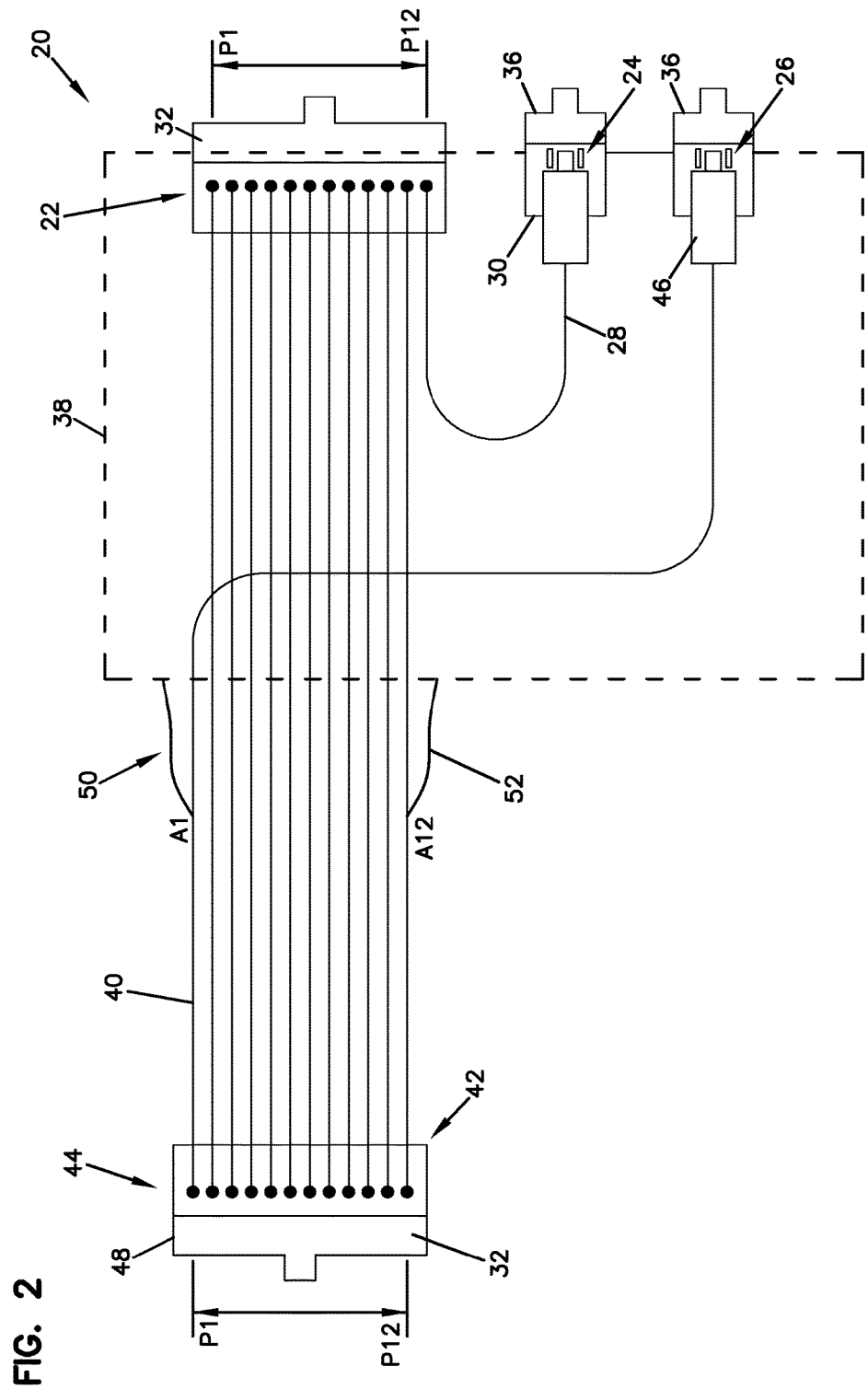
FIG. 2 is a schematic of an indexing terminal in accordance with the principles of the present disclosure.

FIG. 2 illustrates an indexing terminal 20 in accordance with the principles of the present disclosure suitable for supporting a bidirectional indexing architecture such as the bidirectional indexing architecture shown at FIG. 1. The indexing terminal 20 includes a multi-fiber ruggedized de-mateable connection location 22, a first single-fiber ruggedized de-mateable connection location 24 and a second single-fiber ruggedized de-mateable connection location 26. The multi-fiber ruggedized de-mateable connection location 22 includes a plurality of fiber positions labeled P1-P12. One of the fiber positions P1-P12 is coupled to the first single-fiber ruggedized de-mateable connection location 24. For example, as shown at FIG. 2, the fiber position P12 is optically connected to the first single-fiber ruggedized de-mateable connection location 24 by an optical pigtail 28 terminated by a non-ruggedized fiber optic connector 30 that connects to the first single-fiber ruggedized de-mateable connection location 24.

In certain examples, the multi-fiber ruggedized de-mateable connection location 22 is an HMFOC adapter of the type disclosed at U.S. Pat. No. 7,264,402. A dust cap 32 can be used to close an exterior port of the multi-fiber ruggedized de-mateable connection location 22 when a corresponding multi-fiber ruggedized connector is not received therein. The first and second single-fiber ruggedized de-mateable connection locations 24, 26 can be defined by ruggedized, single-fiber adapters of the type disclosed at U.S. Pat. No. 7,959,361. Dust caps 36 can be used to enclose exterior ports of the first and second single-fiber ruggedized de-mateable connection locations 24, 26 when corresponding ruggedized single-fiber connectors are not received therein. In certain examples, the indexing terminal 20 can include a housing 38 on which the multi-fiber ruggedized de-mateable connection location 22, the first single-fiber ruggedized de-mateable connection location 24 and the second single-fiber ruggedized de-mateable connection location 26 are provided. In certain examples, the housing 38 can have a polymeric (e.g., plastic) construction that is relatively rigid in nature. In certain examples, housing 38 can be environmentally sealed and suitable for outdoor use.

Referring still to FIG. 2, the indexing terminal 20 further includes a tether 40 having a first end 42 terminated by a ruggedized multi-fiber optical connector 44 (e.g., an HMFOC connector). The ruggedized multi-fiber optical connector 44 has a plurality of fiber positions labeled P1-P12. One of the fiber positions is optically coupled to the second single-fiber ruggedized de-mateable connection location 26. Others of the fiber positions P1-P12 of the ruggedized multi-fiber optical connector 44 are optically coupled to the multi-fiber ruggedized de-mateable connection location 22. The plurality of fiber lines A1-A12 are provided for making such optical connections. For example, in the depicted embodiment, fiber line A1 optically connects position P1 of the ruggedized multi-fiber optical connector 44 to the second single-fiber ruggedized de-mateable connection location 26. In one example, the fiber line A1 can be a connectorized pigtail having an end terminated by a non-ruggedized fiber optic connector 46 (e.g., an SC-type connector) that is inserted into an interior port of the second non-fiber ruggedized de-mateable connection location 26. The fiber lines A2-A12 are shown optically connecting the ruggedized multi-fiber optical connector 44 to the multi-fiber ruggedized de-mateable connection location 22. The fiber lines A2-A12 are indexed such that the fiber lines A2-A12 are connected to different fiber positions at the ruggedized multi-fiber optical connector 44 as compared to at the multi-fiber ruggedized de-mateable connection location 22. For example, the fiber lines A2-A12 are shown indexed one position so as to be respectively coupled to positions P1-P11 of the multi-fiber ruggedized de-mateable connection location 22.

In certain examples, the ruggedized multi-fiber optical connector 44 includes a dust cap 48 for protecting a ferrule and/or fiber end faces of the connector 44 when the ruggedized multi-fiber optical connector 44 is de-mated from another connector.

In certain examples, the tether 40 is a stub cable that interfaces with the housing 38 of the indexing terminal 20 at a pass-through location 50. In certain examples, a boot 52 can be provided at the pass-through location 50 for providing strain relief and other reinforcement to the tether 40. In certain examples, the tether 40 is a relatively short stub that can be less than 2 feet or less than 1 foot in length. In such examples, the indexing terminal 20 can be daisy chained to a leg terminal by a patch cord of extended length having a first ruggedized multi-fiber connector that mates with the ruggedized multi-fiber optical connector 44 and a second ruggedized multi-fiber connector that mates with the multi-fiber ruggedized de-mateable connection location 22 of the like indexing terminal. In other embodiments, the stub cable formerly the tether 40 can be relatively long (e.g., more than 500 feet or more than 1,000 feet in length). In such examples, the indexing terminal 20 can be coupled to a like indexing terminal by directly mating the ruggedized multi-fiber optical connector 44 with the multi-fiber ruggedized de-mateable connection location 22 of the like indexing terminal.

In alternative embodiments, the pass-through location 50 described above can be replaced with a multi-fiber ruggedized de-mateable connection location similar to the multi-fiber ruggedized de-mateable connection location 22. In this type of example, an extended patch cord having opposite ends terminated by ruggedized multi-fiber optical connectors can be used to couple the indexing terminal to a like terminal.

In certain examples, the indexing terminal 20 is configured to be used at relatively small, narrow installation locations such as within a trench. In this regard, the housing 38 can have a relatively narrow dimension (e.g., an insertion profile dimension) in at least one orientation to facilitate installing the indexing terminal 20 in the narrow installation site. The insertion profile dimension represents the smallest spacing into which the housing can be fully inserted. In the case of a trench, the insertion profile dimension corresponds to the narrowest width trench into which the housing can be installed. In certain examples, the housing 38 can have at least an insertion profile dimension (e.g., a width) that is less than three times an inner diameter of an exterior port of the multi-fiber ruggedized de-mateable connection location 22. It will be appreciated that the exterior port of the multi-fiber ruggedized de-mateable connection location 22 is configured for receiving a ruggedized multi-fiber connector. Additionally, in certain examples, the insertion profile dimension of the housing 38 can be less than four times an inner diameter of an exterior port of each of the first and second single-fiber ruggedized de-mateable connection locations 24, 26. It will be appreciated that the inner diameter of each of the exterior ports of the first and second single-fiber ruggedized de-mateable connection locations 24, 26 are configured for receiving a ruggedized single-fiber connector.

Figure 3:
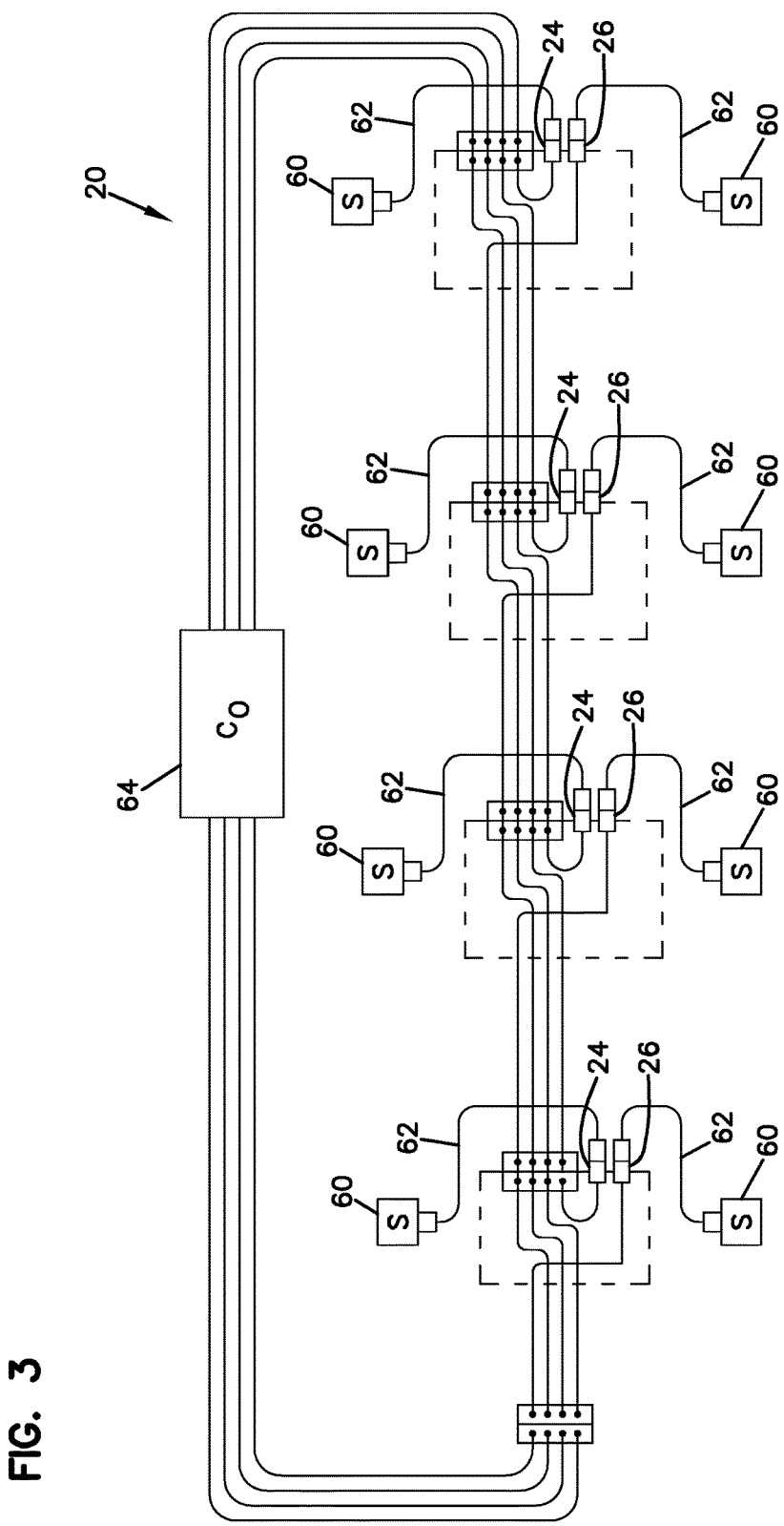
FIG. 3 is a schematic of a plurality of the indexing terminals shown in FIG. 2 daisy chained together.

FIG. 3 shows a plurality of the indexing terminals 20 daisy chained together to define a fiber optic network having bidirectional indexing architecture. The first and second single-fiber ruggedized de-mateable connection locations 24, 26 are shown connected to subscriber locations 60 by drop cables 62. For ease of depiction, the indexing terminals 20 have been shown with only four fiber lines. However, it will be appreciated that any number of fiber lines can be utilized within the scope of the present disclosure. The fiber optic network is shown including a fiber loop that interfaces with a central office 64.

Figure 4:
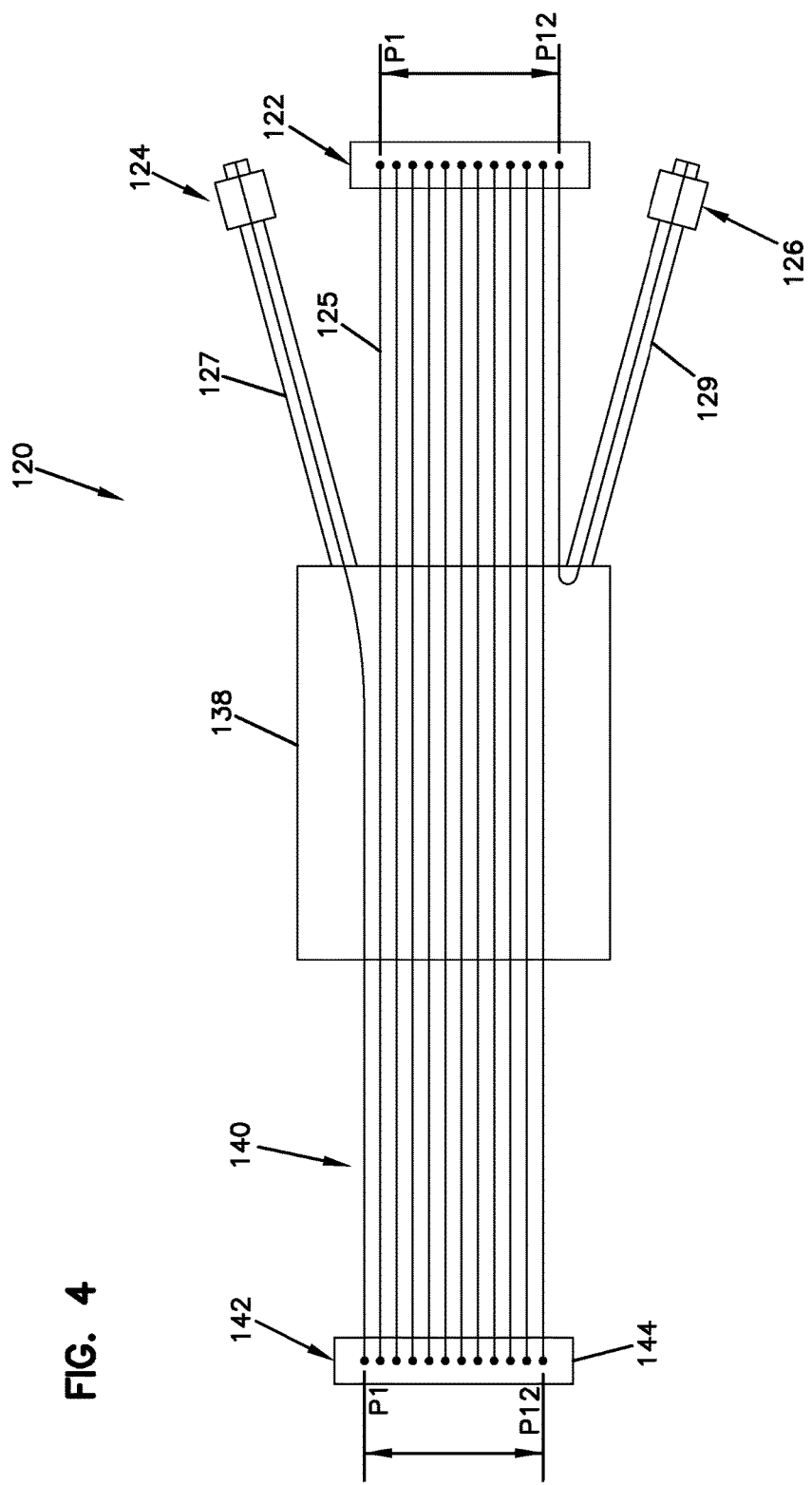
FIG. 4 is a schematic of another example of an indexing terminal in accordance with the principles of the present disclosure.

FIG. 4 shows another indexing terminal 120 in accordance with the principles of the present disclosure. The indexing terminal 120 includes a housing 138. In certain examples, the housing 138 can have a relatively flexible configuration. For example, the housing 138 can be constructed of a flexible overmold material. In other examples, the housing 138 may be a more rigid plastic. The indexing terminal 120 also includes a multi-fiber ruggedized de-mateable connection location 122, a first single-fiber ruggedized de-mateable connection location 124 and a second single-fiber ruggedized de-mateable connection location 126. The multi-fiber ruggedized de-mateable connection location 122 includes a plurality of fiber positions P1-P12 with one of the fiber positions optically coupled to the first single-fiber ruggedized de-mateable connection location 124. The multi-fiber ruggedized de-mateable connection location 122, the first single-fiber ruggedized de-mateable connection location 124 and the second single-fiber ruggedized de-mateable connection location 126 are provided at the ends of flexible stub cables 125, 127, and 129 that extend outwardly from the housing 138. The stub cable 125 is a multi-fiber cable having a free end terminated by a multi-fiber ruggedized connector that forms the multi-fiber ruggedized de-mateable connection location 122. The stub cable 127 is a single-fiber stub cable having a free end terminated by a single-fiber ruggedized fiber optic connector that forms the first single-fiber ruggedized de-mateable connection location 124. The second stub cable 129 is a single-fiber cable having a free end terminated by a single-fiber ruggedized fiber optic connector that forms the second single-fiber ruggedized de-mateable connection location 126.

The indexing terminal 120 also includes a tether 140 having a first end 142 terminated by a ruggedized multi-fiber optical connector 144. The ruggedized multi-fiber connector 144 has a plurality of fiber positions labeled P1-P12. One of the fiber positions is optically connected to the second single-fiber ruggedized de-mateable connection location 126. The remainder of the fiber positions P1-P12 of the ruggedized multi-fiber connector 144 are optically coupled to the multi-fiber ruggedized de-mateable connection location 122. Fiber lines A1-A12 can be provided for making the optical connections between the ruggedized multi-fiber optical connector 144 and the multi-fiber ruggedized de-mateable connector location 122 as well as the second single-fiber ruggedized de-mateable connection location 126. The fiber lines that connect the ruggedized multi-fiber optical connector 144 to the multi-fiber ruggedized de-mateable connection location 122 are indexed such that the fiber lines are connected to different fiber positions at the ruggedized multi-fiber connector 144 as compared to at the multi-fiber ruggedized de-mateable connection location 122. As shown at FIG. 4, fiber position P1 of the ruggedized multi-fiber optical connector 144 is optically connected to the first single-fiber ruggedized de-mateable connection location 124. Also, fiber positions P2-P12 of the ruggedized multi-fiber optical connector 144 are respectively optically connected to positions P1-P11 of the multi-fiber ruggedized de-mateable connection location 122. Fiber position P12 of the multi-fiber ruggedized de-mateable connection location 122 is optically connected to the second single-fiber ruggedized de-mateable connection location 126.

Figure 8:
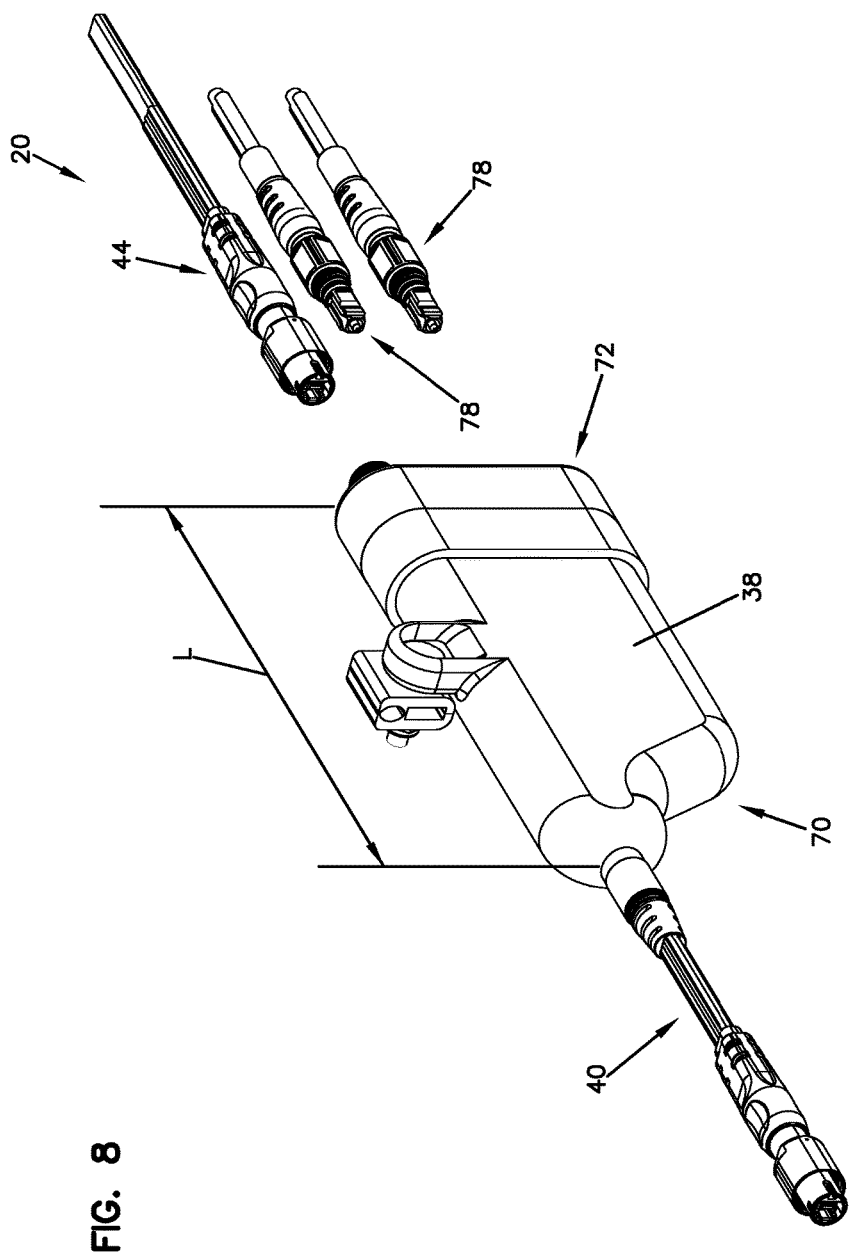
FIG. 8 is a left perspective view of the indexing terminal housing shown in FIG. 6 with the dust caps off and corresponding cables.
Figure 9:
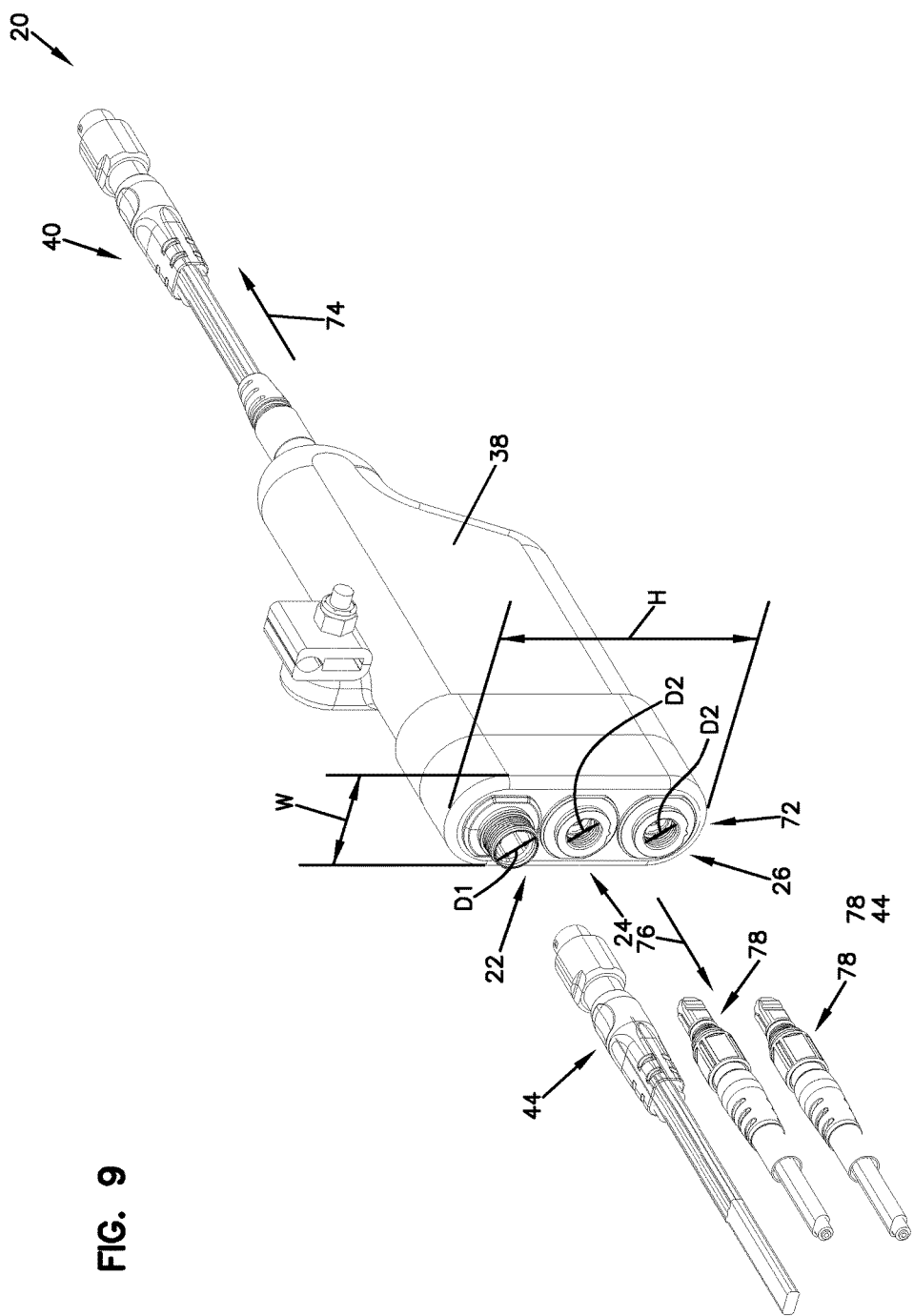
FIG. 9 is a right perspective view of FIG. 8.
Figure 10:
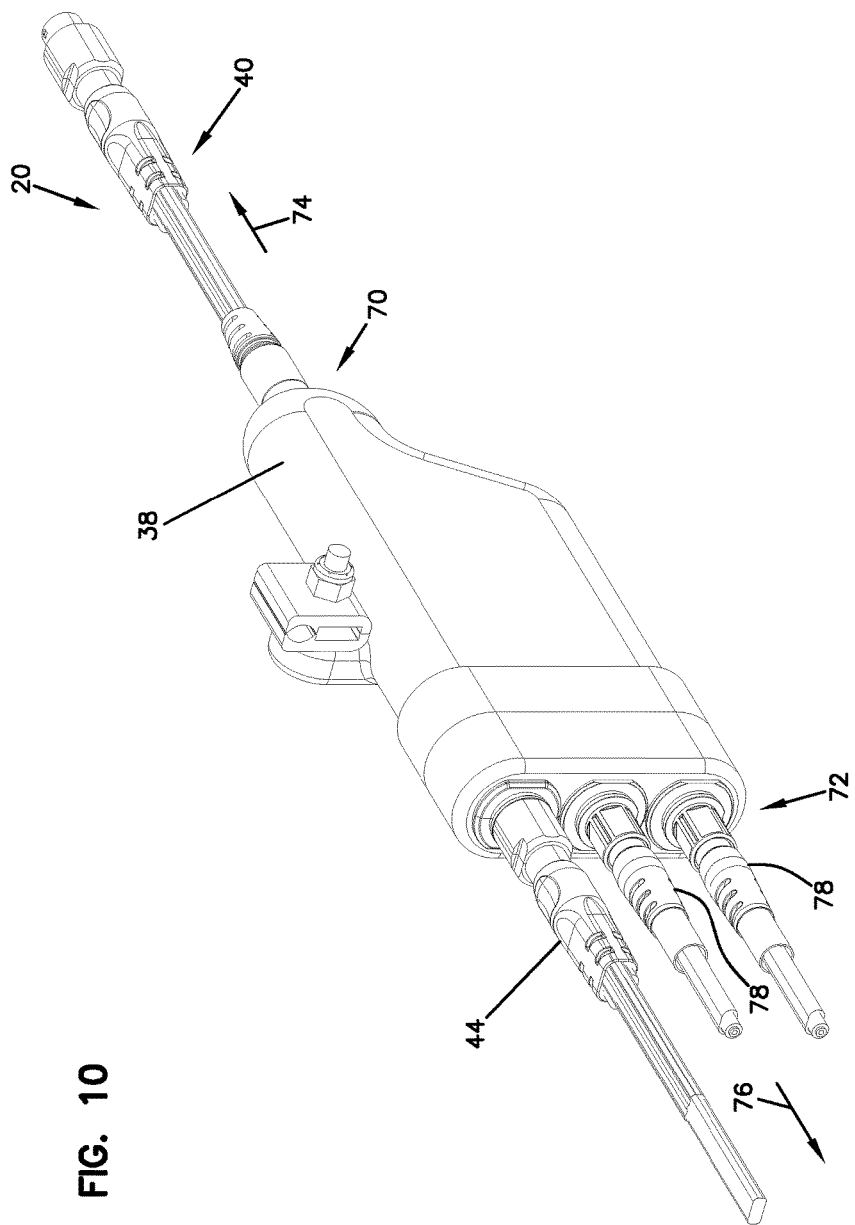
FIG. 10 is a right perspective view of the indexing terminal housing shown in FIG. 9 with the corresponding cables mated with corresponding connectors in accordance with principles of the present disclosure.
Figure 11:
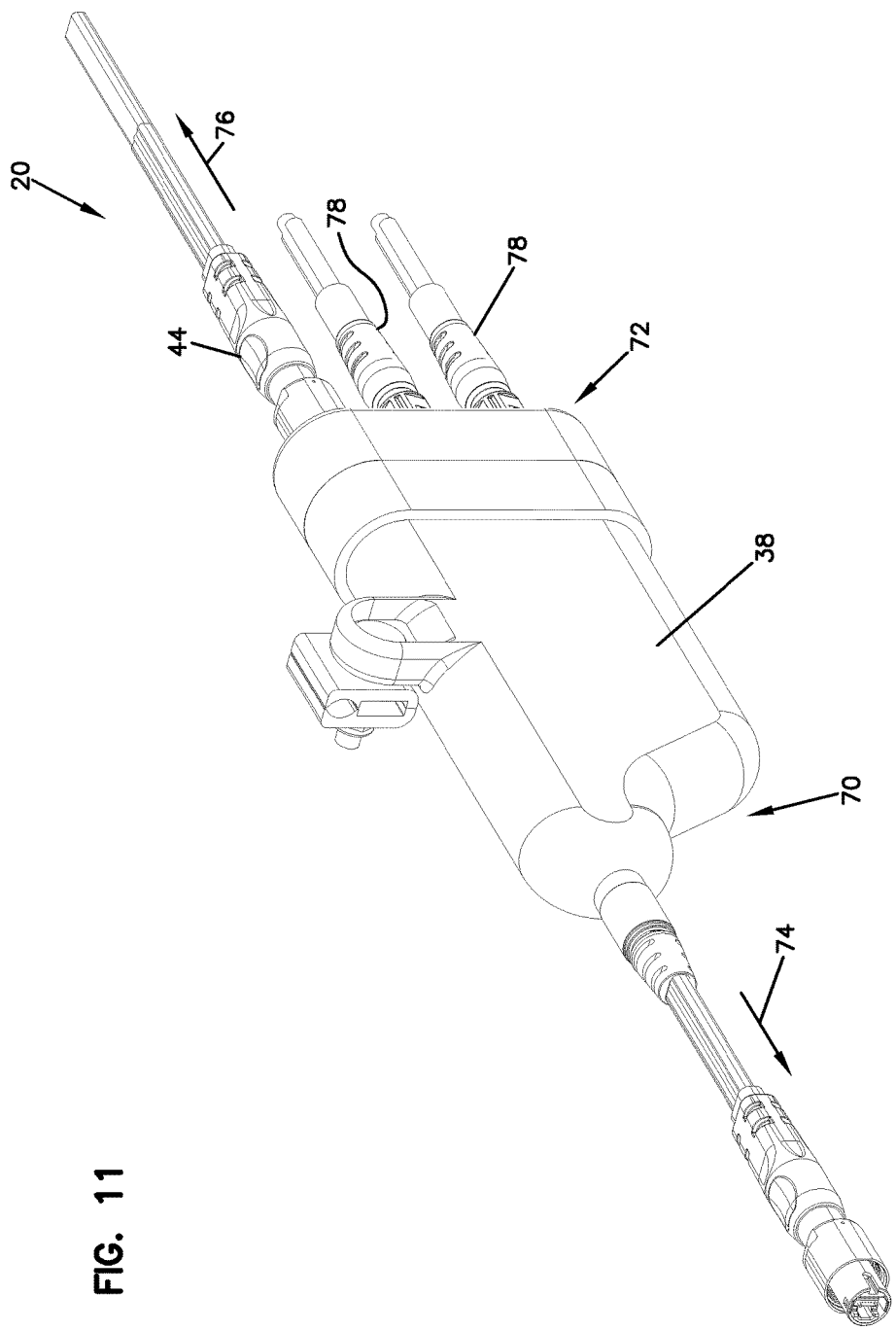
FIG. 11 is left perspective view of FIG. 10.

FIGS. 6-11 further depict the indexing terminal 20. As shown at FIGS. 8 and 9, the housing 38 has a length L, a width W and a height H that are all perpendicular relative to one another. The width W represents the insertion profile dimension of the housing 38. The length L extends between opposite first and second ends 70, 72 of the housing 38. The tether 40 interfaces with the housing 38 at the first end 70 and extends outwardly from the first end 70 of the housing 38 in a first direction 74. The multi-fiber ruggedized de-mateable connection location 22, the first single-fiber ruggedized de-mateable connection location 24 and the second single-fiber ruggedized de-mateable connection location 26 are provided at the second end 72 of the housing 38. Exterior ports of the multi-fiber ruggedized de-mateable connection location 22, the first single-fiber ruggedized de-mateable connection location 24 and the second single-fiber ruggedized de-mateable connection location 26 face in a second direction 76 that is diametrically opposite from the first direction 74. The multi-fiber ruggedized de-mateable connection location 22, the first single-fiber ruggedized de-mateable connection location 24 and the second single-fiber ruggedized de-mateable connection location 26 define axes that are parallel to one another.

The multi-fiber ruggedized de-mateable connection location 22 is defined by a ruggedized, multi-fiber adapter configured for receiving a ruggedized multi-fiber optical connector such as the ruggedized multi-fiber optical connector 44 of a like indexing terminal. The exterior port defined by the multi-fiber ruggedized de-mateable connection location 22 defines an interior diameter D1 sized for receiving the ruggedized multi-fiber optical connector 44 of a like indexing terminal 20. In certain examples, the width W of the housing 38 is less than three times the inner diameter D1 of the multi-fiber ruggedized de-mateable connection location 22.

The first and second single-fiber ruggedized de-mateable connection locations 24, 26 can be defined by ruggedized fiber optic adapters as shown at FIG. 9. Such ruggedized fiber optic adapters can define internal diameters D2 sized for receiving corresponding ruggedized fiber optic connectors 78 corresponding to cables such as drop cables. In certain examples, the width W of the housing is less than four times the inner diameter D2 of each of the exterior ports of the first and second single-fiber ruggedized de-mateable connection locations 24, 26.

Figure 12:
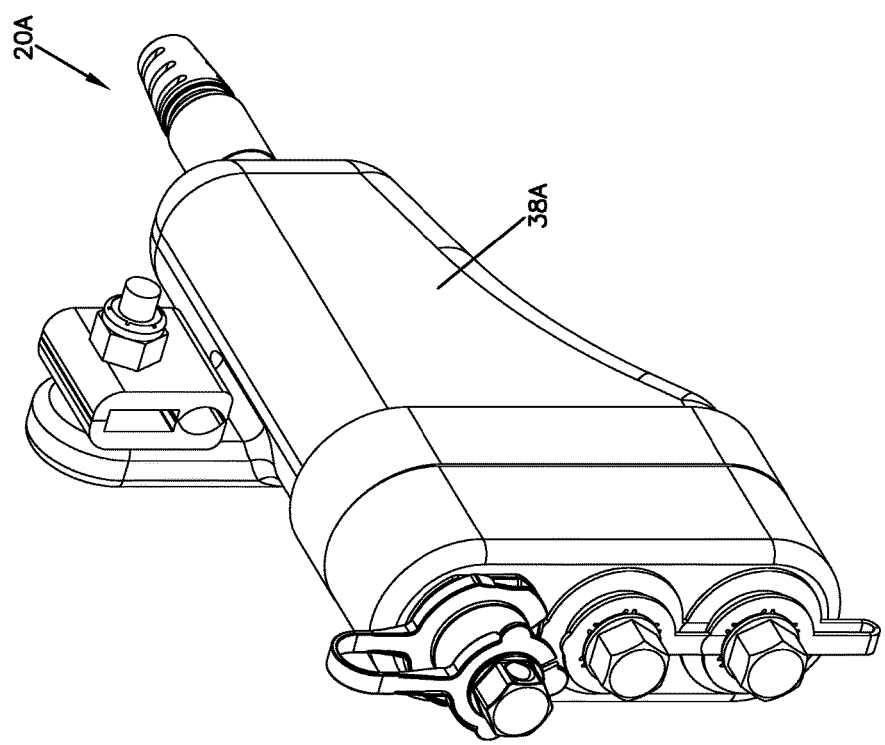
FIG. 12 is a perspective view of another indexing terminal housing in accordance with the principles of the present disclosure.

FIG. 12 shows another indexing terminal 20A in accordance with the principles of the present disclosure. The indexing terminal 20A has the same basic configuration as the indexing terminal 20 except the length of the housing 38A has been shortened.

FIGS. 13 and 14 show a further indexing terminal 20B in accordance with the principles of the present disclosure. The indexing terminal 20B is configured such that the multi-fiber ruggedized de-mateable connection location 22B and one of the first and second single-fiber ruggedized de-mateable connection locations 24B, 26B face in the second direction 76. Additionally, the other of the first and second single-fiber ruggedized de-mateable connection locations 24B, 26B is located at the opposite end of the housing 38B of the indexing terminal and faces in the first direction 74.

Figure 15:
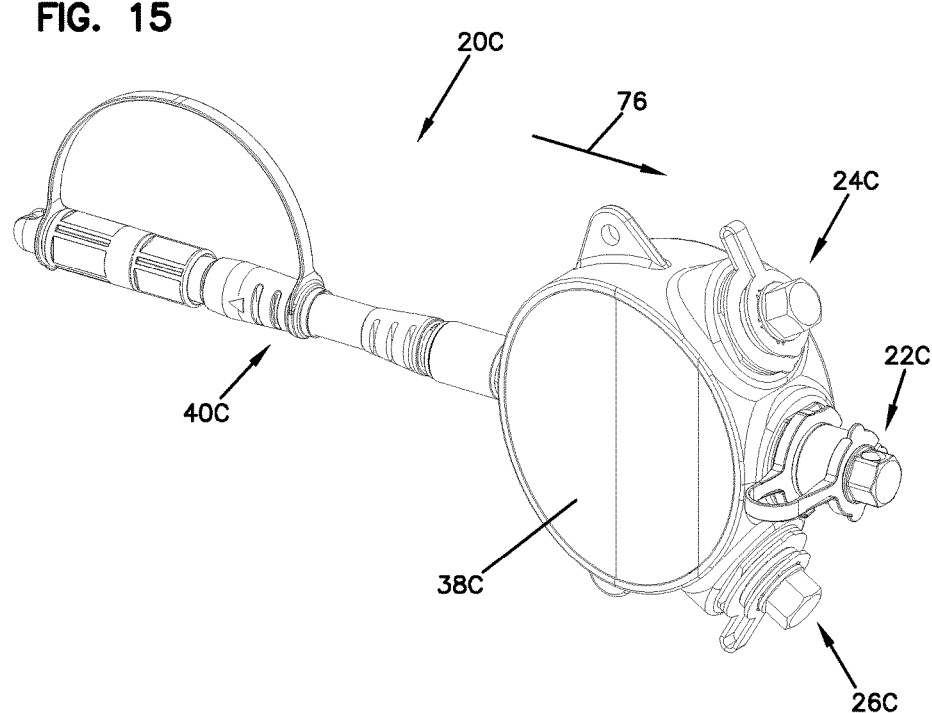
FIG. 15 is a left perspective view of another indexing terminal housing in accordance with the principles of the present disclosure.
Figure 16:
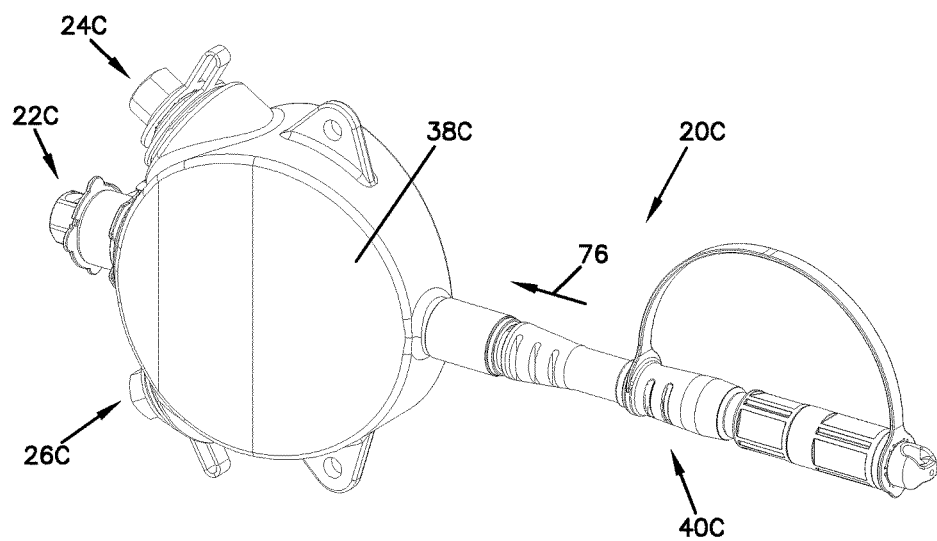
FIG. 16 is a right perspective view of FIG. 15.

FIGS. 15 and 16 show still another indexing terminal 20C in accordance with the principles of the present disclosure. The indexing terminal 20C has a housing 38C that includes opposite major sides interconnected by a generally cylindrical sidewall. The multi-fiber ruggedized de-mateable connection location 22C and the first and second single-fiber ruggedized de-mateable connection locations 24C, 26C are provided on the cylindrical sidewall. The tether 40C passes through the cylindrical sidewall. The multi-fiber ruggedized de-mateable connection location 22C faces in the second direction 76 and the first and second single-fiber ruggedized de-mateable connection locations 24C, 26C are angled to face only partially in the second direction 76. The first and second single-fiber ruggedized de-mateable connection locations 24C, 26C define axes that are angled relative to one another.

Figure 17:
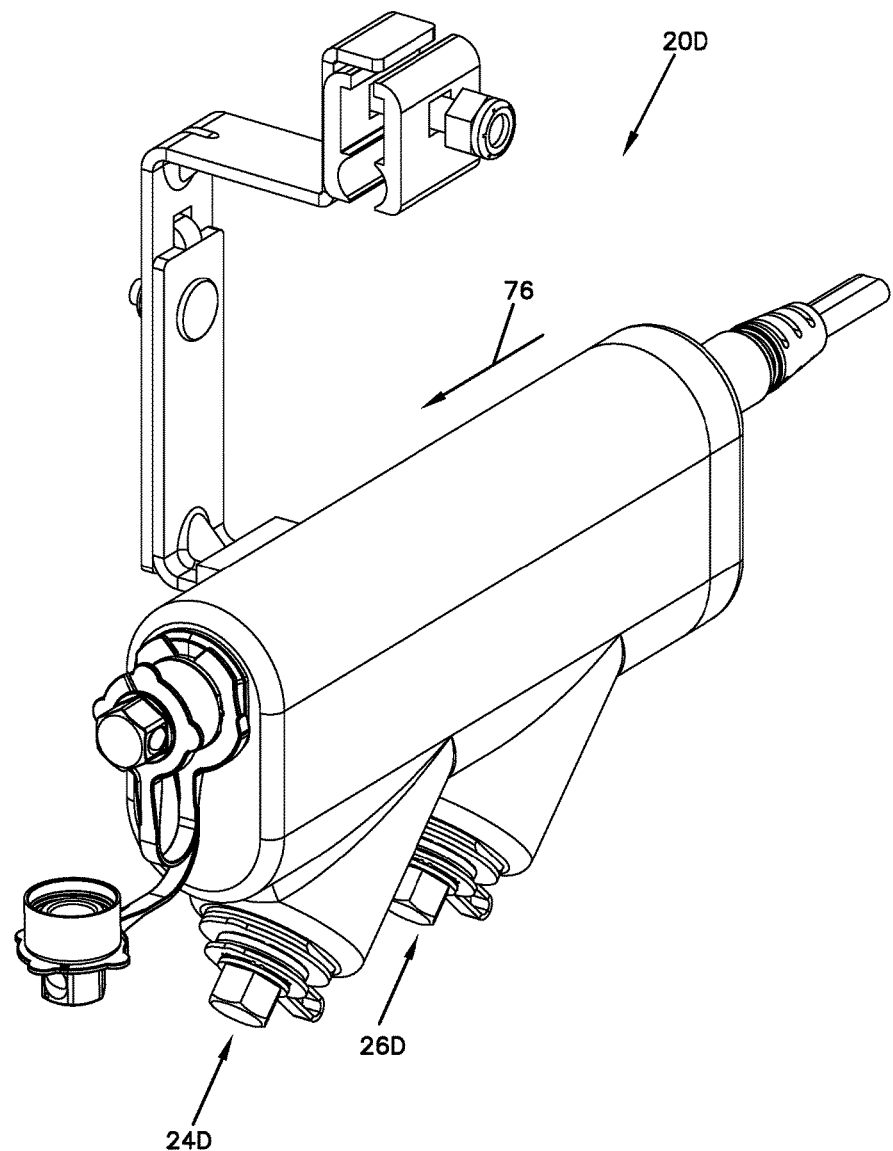
FIG. 17 is a right perspective view of another indexing terminal housing in accordance with the principles of the present disclosure.
Figure 18:
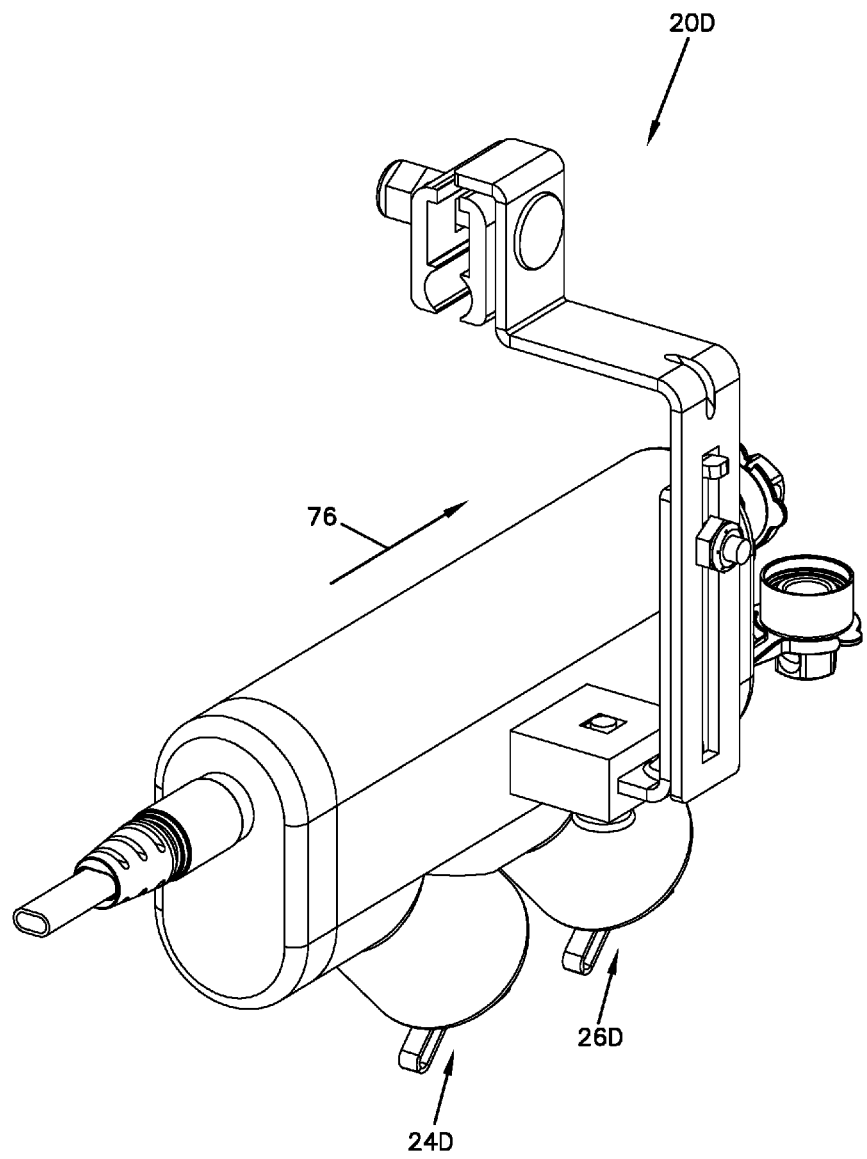
FIG. 18 is a left perspective view of FIG. 17.

FIGS. 17 and 18 show an indexing terminal 20D in accordance with the principles of the present disclosure. The indexing terminal 20D is configured such that the first and second single-fiber ruggedized de-mateable connection locations 24D, 26D are angled to face only partially in the second direction 76. The first and second single-fiber ruggedized de-mateable connection locations 24D, 26D have defined axes that are parallel to one another.

Figure 19:
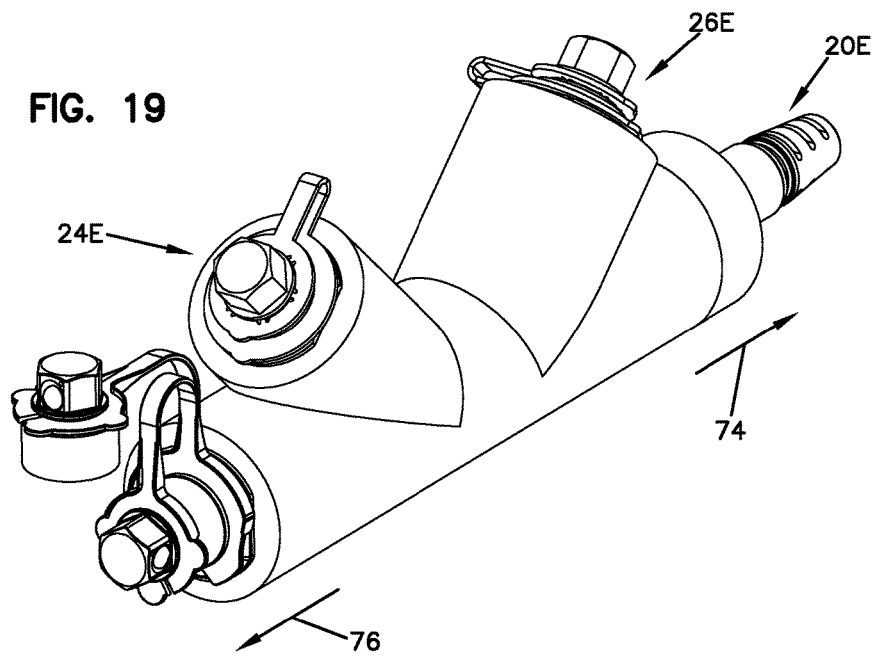
FIG. 19 is a right perspective view of another indexing terminal housing in accordance with the principles of the present disclosure.
Figure 20:
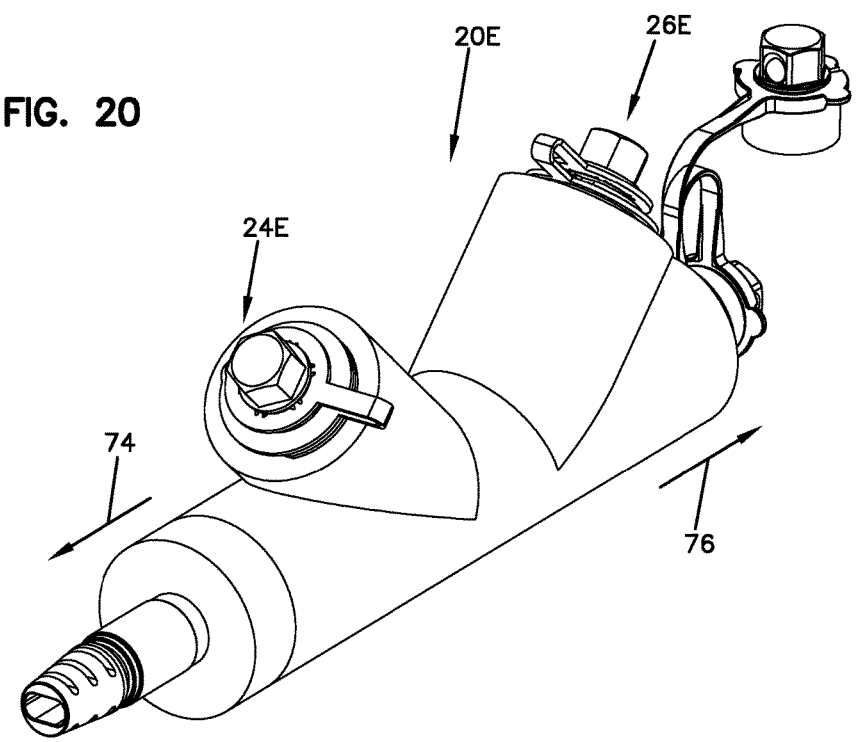
FIG. 20 is a left perspective view of FIG. 19.
Figure 21:
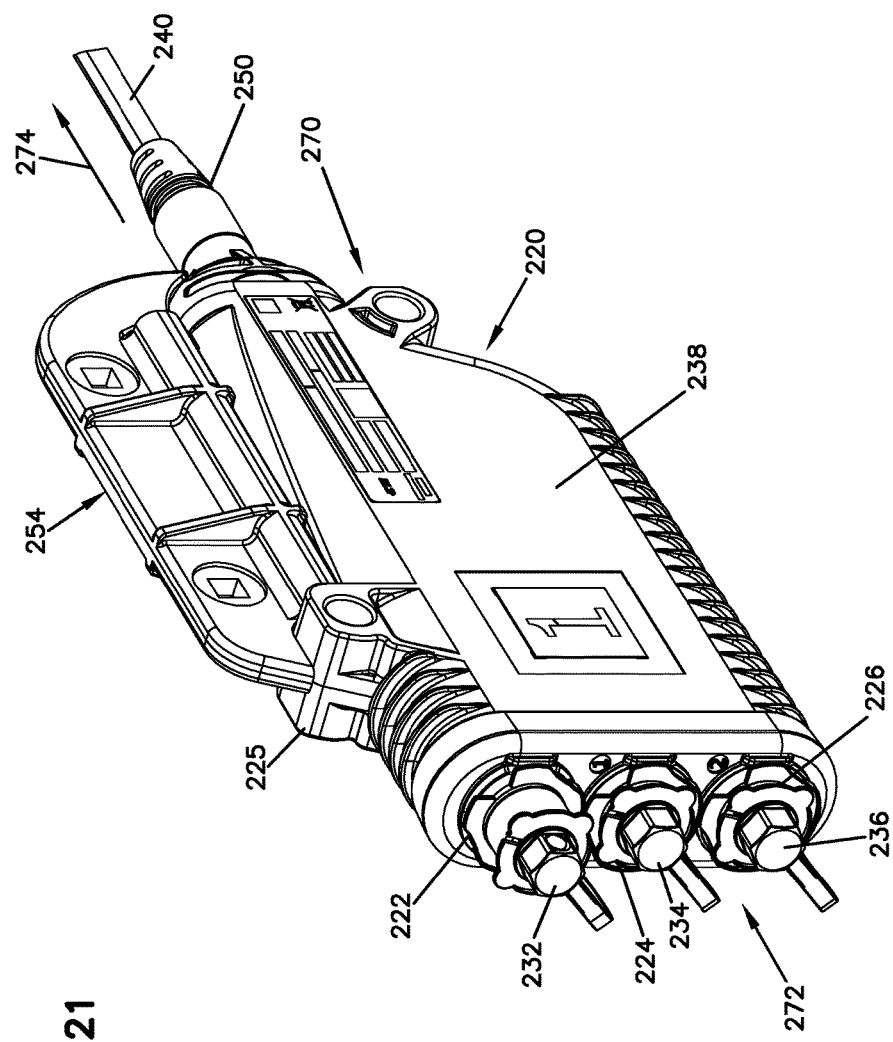
FIG. 21 is a first end perspective view of another indexing terminal housing in accordance with the principles of the present disclosure.

FIGS. 19 and 20 show a further indexing terminal 20E in accordance with the principles of the present disclosure. The indexing terminal 20E is configured such that one of the first and second single-fiber ruggedized de-mateable connection locations 24E, 26E is angled to face partially in the first direction 74 and the other of the first and second single-fiber ruggedized de-mateable connection locations 24E, 26E are angled to face partially in the second direction 76.

FIGS. 21-33 shows an indexing terminal 220 suitable for supporting a bidirectional indexing architecture such as the bidirectional indexing architecture shown at FIG. 1. The indexing terminal 220 includes a first multi-fiber ruggedized de-mateable connection location 250, a second multi-fiber ruggedized de-mateable connection location 222, a first single-fiber ruggedized de-mateable connection location 224, and a second single-fiber ruggedized de-mateable connection location 226. The first multi-fiber ruggedized de-mateable connection location 222 includes a plurality of fiber positions labeled P1-P12. One of the fiber positions P1-P12 is coupled to the first single-fiber ruggedized de-mateable connection location 224 via a breakout line 253. Another of the fiber positions P1-P12 is coupled to the second single-fiber ruggedized de-mateable connection location 224 via another breakout line 253. The remaining fiber positions P1-P12 are coupled to the second multi-fiber ruggedized de-mateable connection location 222 via first lines 251.

In certain implementations, the second multi-fiber ruggedized de-mateable connection location 222 defines fiber positions J1-J12. Two of the fiber positions J1-J12 are not coupled to the first multi-fiber ruggedized de-mateable connection location 250 because of the two breakout lines. In some implementations, these two fiber positions can be coupled to the first and second single-fiber ruggedized de-mateable connection locations 224, 226 as will be described in more detail herein.

The indexing terminal 220 includes a housing 238 having a length L2 that extends between opposite first and second ends 270, 272 of the housing 238. In certain examples, the indexing terminal 220 includes mounting members 225 for installation at deployment sites. In the example shown, the mounting members 225 define apertures through which cable ties, yarn, or other flexible members can be threaded to secure the indexing terminal 220 to a structure or surface.

A first multi-fiber cable 240 interfaces with the housing 238 at the first end 270 and extends outwardly from the first end 270 of the housing 238 in a first direction 274. The first end 270 of the housing 238 defines a first multi-fiber ruggedized de-mateable connection location 250 for receiving the first multi-fiber cable 240. A second end 272 of the housing 238 defines a second multi-fiber ruggedized de-mateable connection location 222. In certain examples, the second multi-fiber ruggedized de-mateable connection location 222 faces in a second direction 276 that is diametrically opposite from the first direction 274. In an example, the second multi-fiber ruggedized de-mateable connection location 222 is axially aligned along the length L2 of the housing 238 with the first multi-fiber ruggedized de-mateable connection location 250.

A plurality of optical fibers extend along a first path within the housing 238 between the first multi-fiber ruggedized de-mateable connection location 250 and the second multi-fiber ruggedized de-mateable connection location 222. Accordingly, optical signals carried by the first multi-fiber cable 240 are carried by the optical fibers from the first connection location 250 to the second connection location 222. A second multi-fiber cable can be received at the second multi-fiber ruggedized de-mateable connection location 222. Optical fibers of the second multi-fiber cable can receive optical signals from the optical fibers.

The second end 272 of the housing 238 also defines a first single-fiber ruggedized de-mateable connection location 224. In an example, the first single-fiber ruggedized de-mateable connection location 224 faces in the second direction 276. A first breakout optical fiber extends along a second path within the housing 238 from the first multi-fiber ruggedized de-mateable connection location 250 to the first single-fiber ruggedized de-mateable connection location 224. Accordingly, optical signals carried by an optical fiber of the first multi-fiber cable 240 are carried by the first breakout optical fiber from the first connection location 250 to the first single-fiber ruggedized de-mateable connection location 224. In certain examples, the second multi-fiber ruggedized de-mateable connection location 222 and the first single-fiber ruggedized de-mateable connection location 224 define axes that are parallel to one another.

The second end 272 of the housing 238 also defines a second single-fiber ruggedized de-mateable connection location 226. In an example, the second single-fiber ruggedized de-mateable connection location 226 faces in the second direction 276. A second breakout optical fiber extends along a third path within the housing 238 from the first multi-fiber ruggedized de-mateable connection location 250 to the second single-fiber ruggedized de-mateable connection location 226. Accordingly, optical signals carried by another optical fiber of the first multi-fiber cable 240 are carried by the second breakout optical fiber from the first connection location 250 to the second single-fiber ruggedized de-mateable connection location 226. In certain examples, the second multi-fiber ruggedized de-mateable connection location 222, the first single-fiber ruggedized de-mateable connection location 224, and the second single-fiber ruggedized de-mateable connection location 226 define axes that are parallel to one another.

In the example shown in FIG. 14, a respective dust cap 232, 234, 236 is provided at each of the ruggedized connection locations 222, 224, 226 on the second end 272 of the housing 238. The dust caps 232, 234, 236 inhibit dust, water, or other contaminants from entering the housing 238 through the connection locations 222, 224, 226. The dust caps 232, 234, 236 are removed to connect a cable at the respective connection location.

Figure 22:
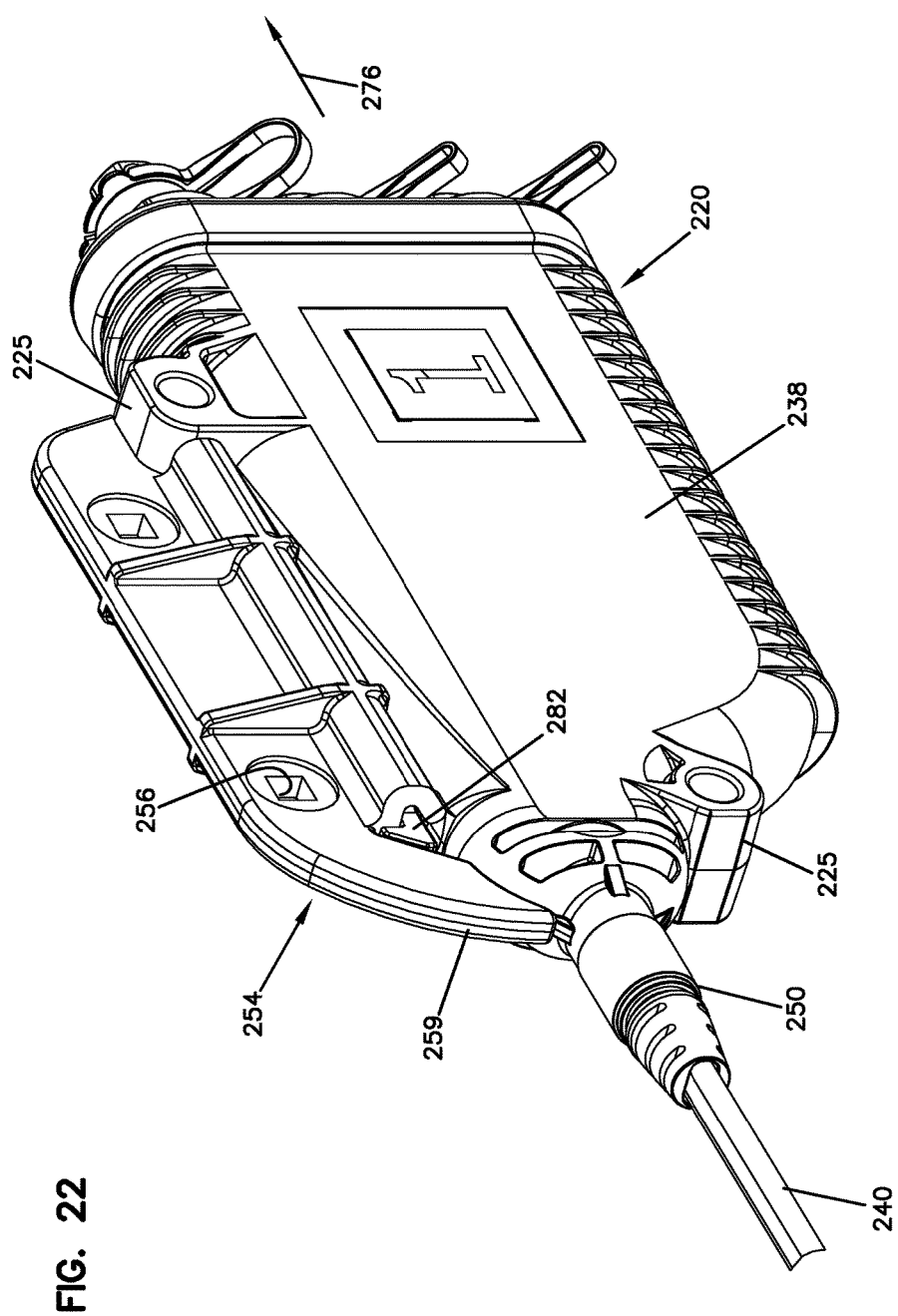
FIG. 22 is a second end perspective of the indexing terminal of FIG. 21.
Figure 23:
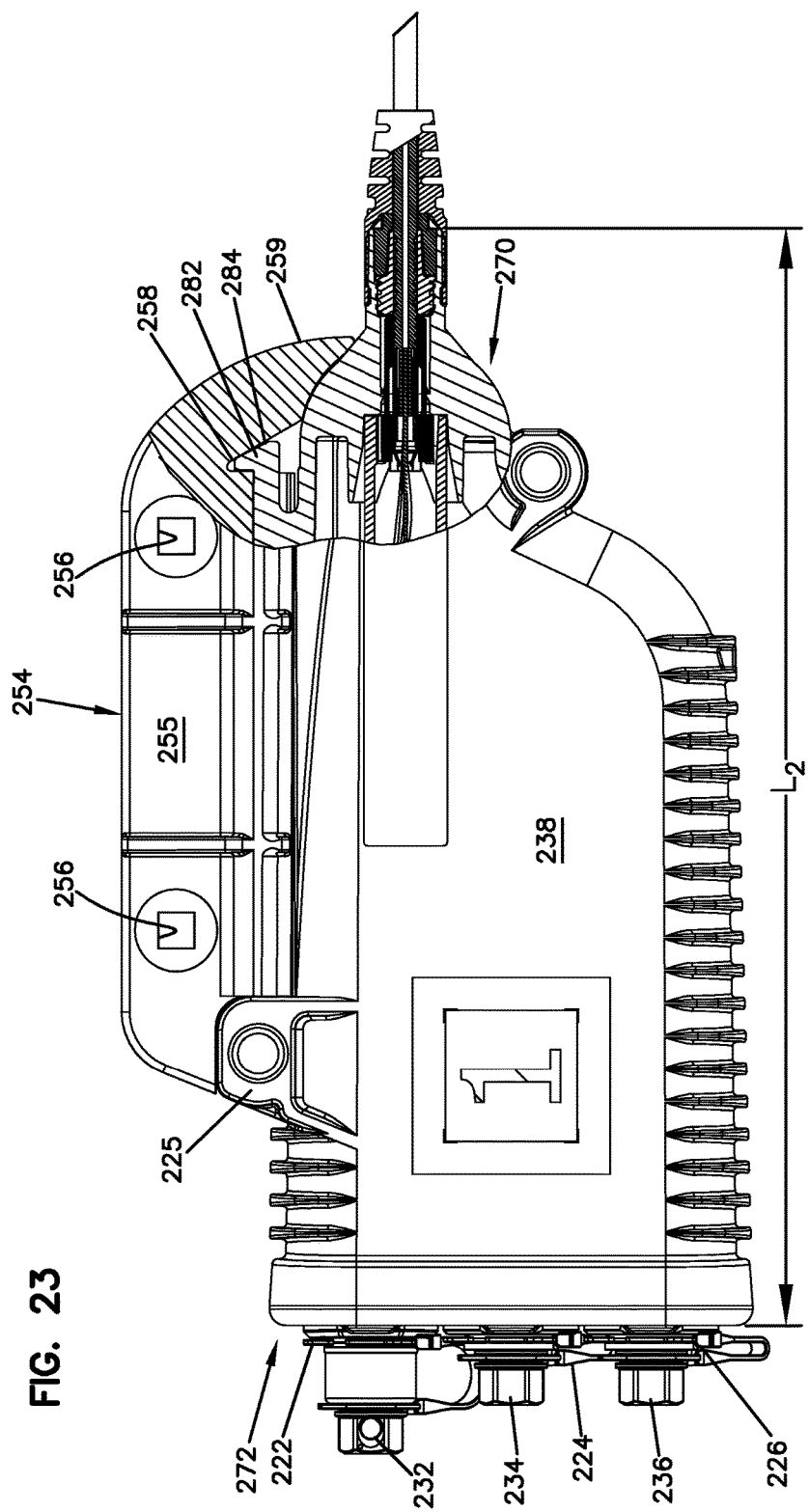
FIG. 23 is a side elevational view of the indexing terminal of FIG. 21.
Figure 24:
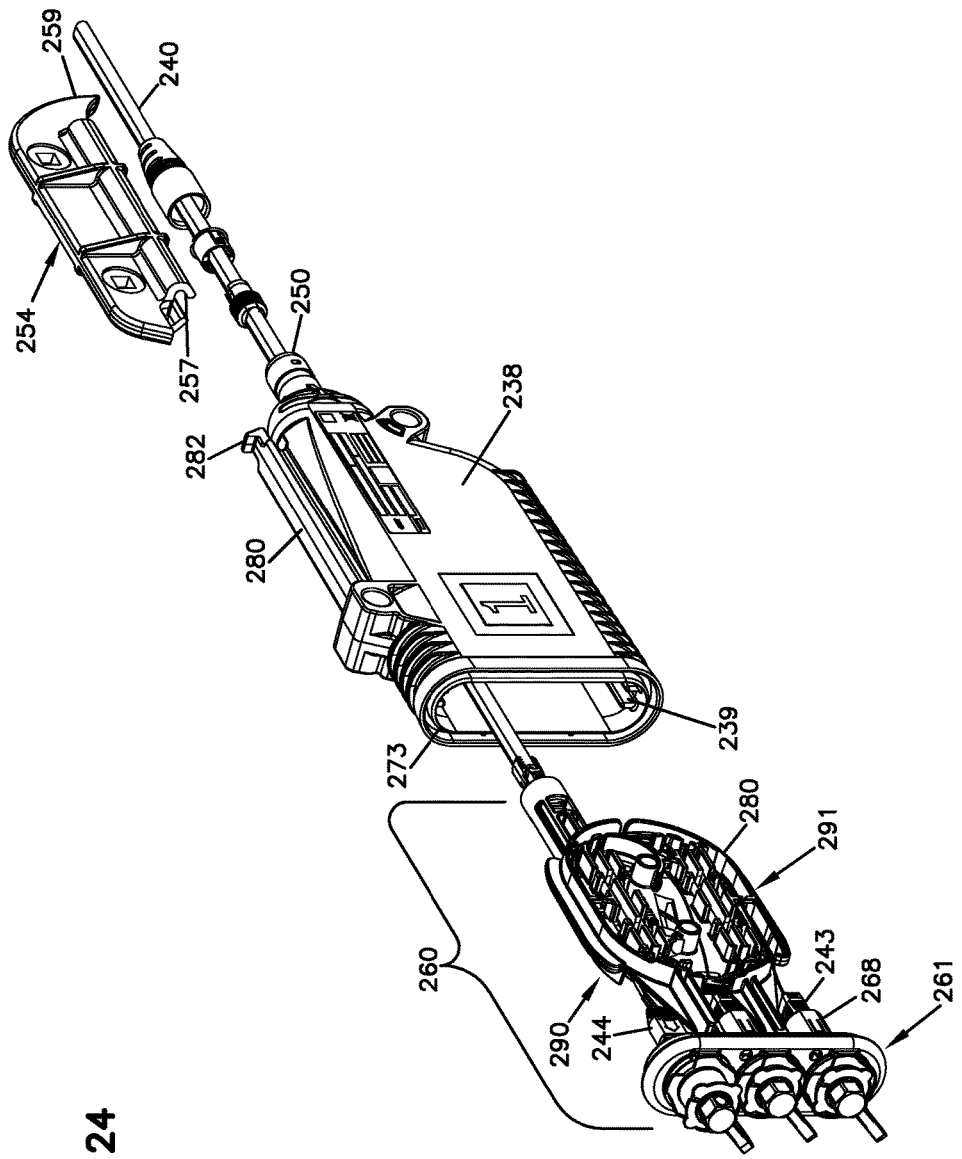
FIG. 24 is an exploded view of the indexing terminal of FIG. 21 including a housing, a management insert, and an aerial mounting bracket.
Figure 25:
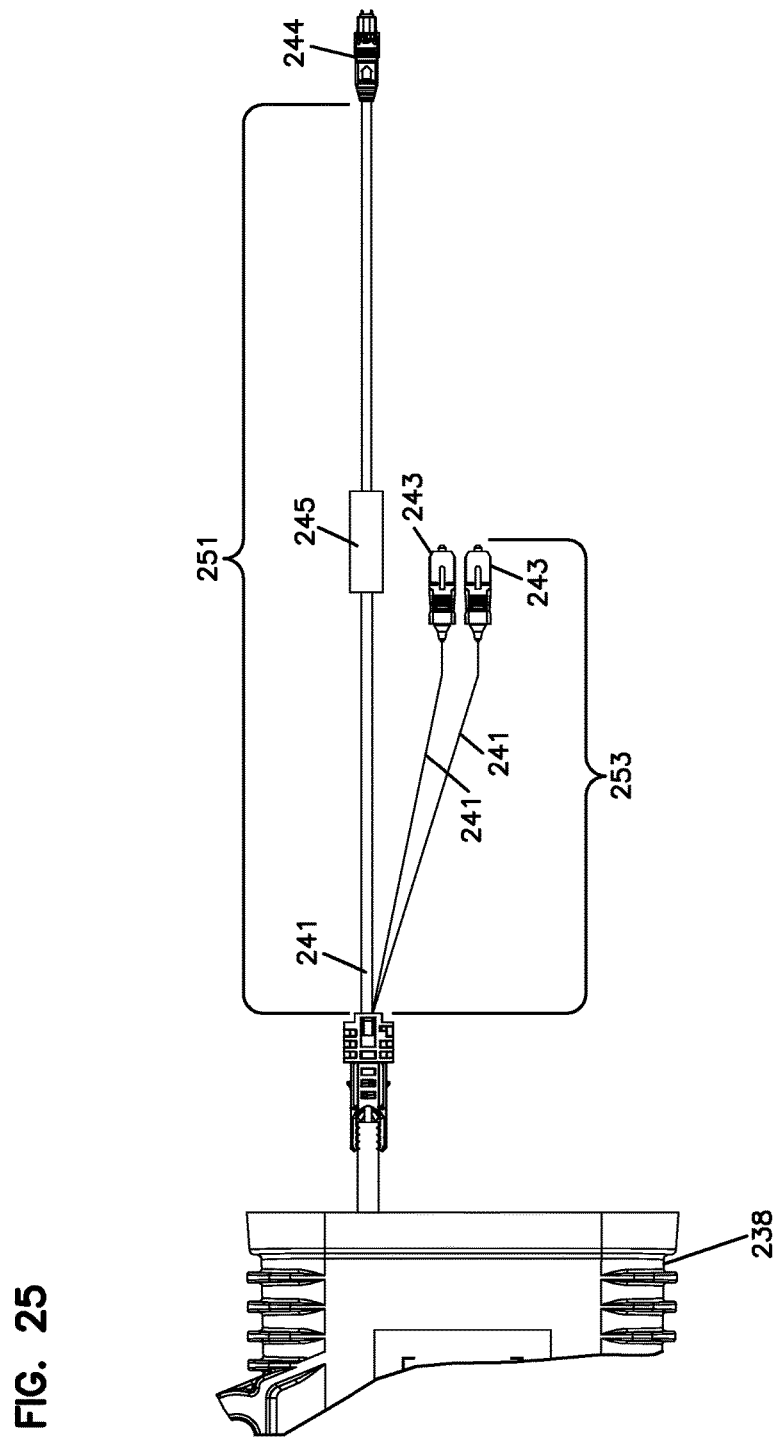
FIG. 25 illustrates a first cabling scheme in which two breakout fibers are separated from a remainder of the optical fibers, which are mass fusion spliced to connectorized stub fibers.
Figure 26:
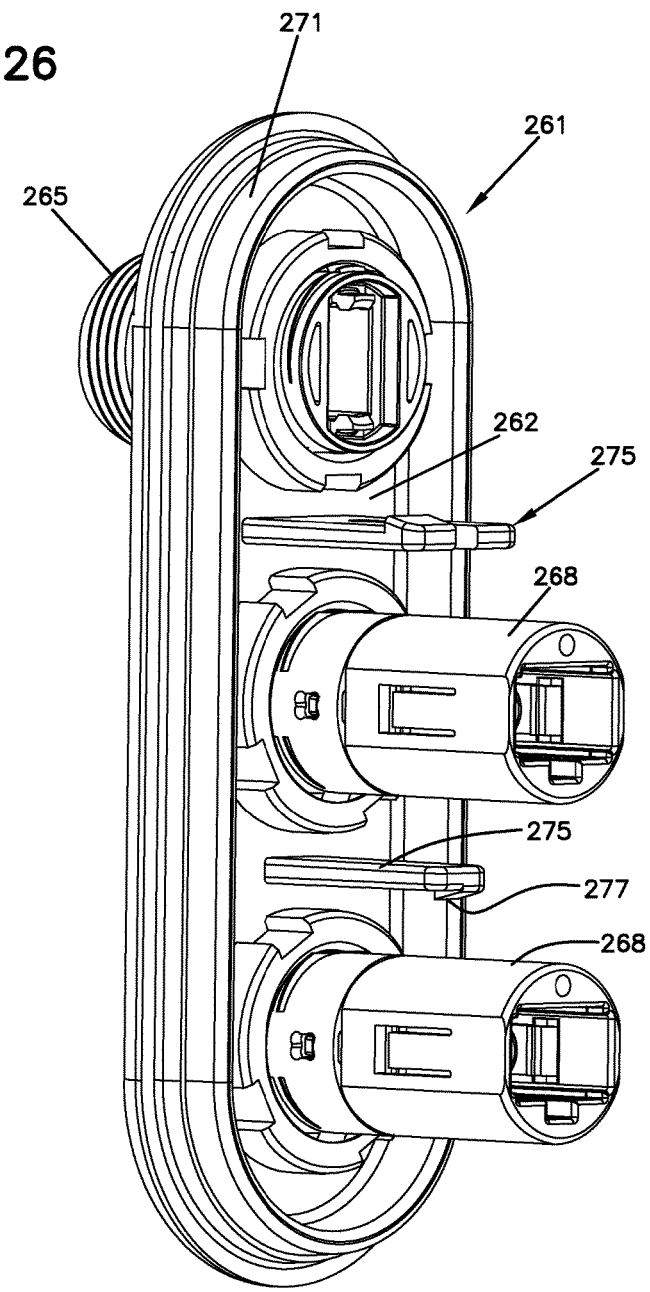
FIG. 26 is a perspective view of an example port arrangement of the management insert of FIG. 24.
Figure 27:
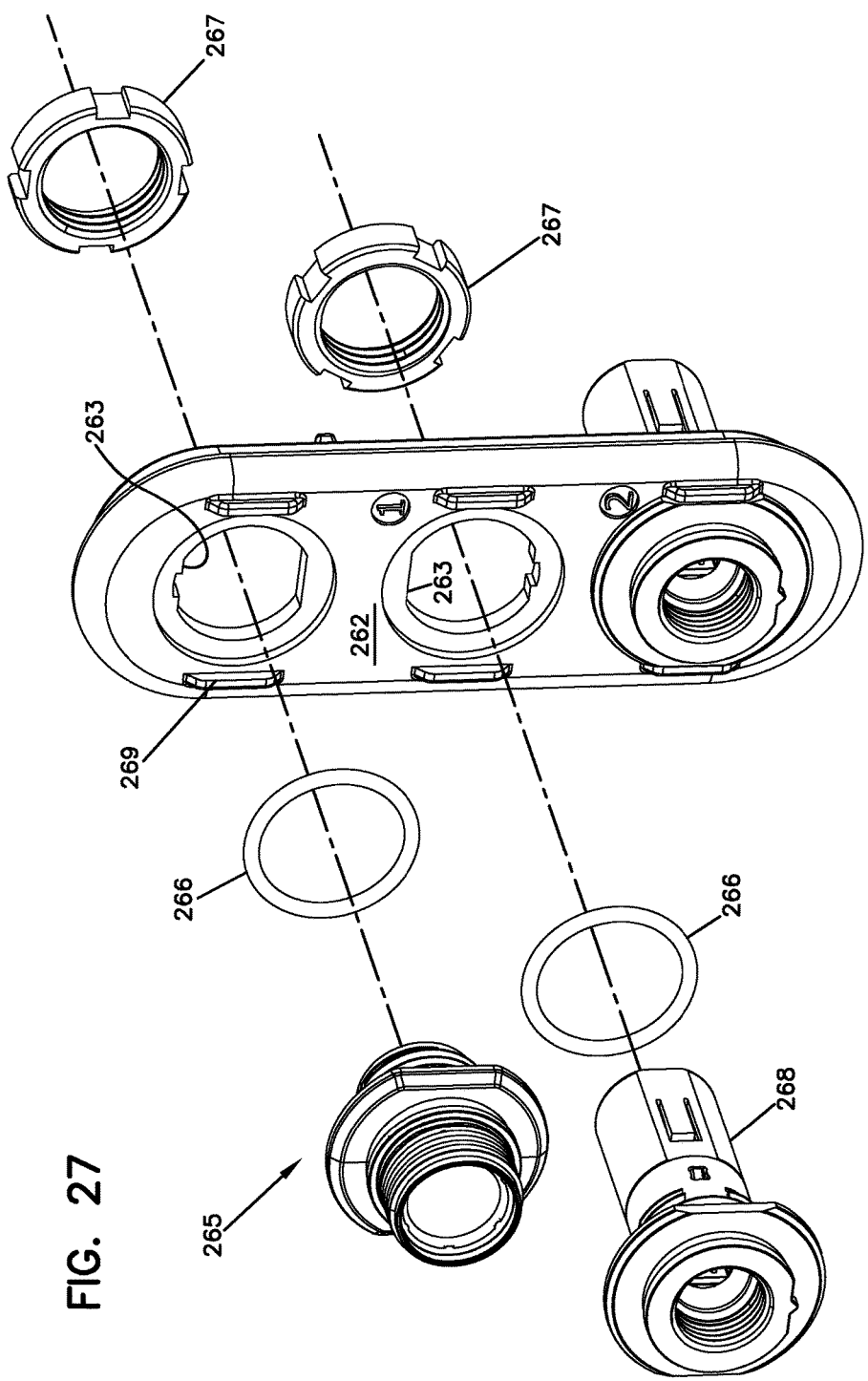
FIG. 27 is an exploded view of port arrangement shown in FIG. 26.

Referring to FIGS. 22-24, the housing 238 may be assembled with an aerial mounting bracket 254 for hanging or otherwise installing the indexing terminal 220 at deployment sites. The aerial mounting bracket 254 includes a flange 255 defining one or more mounting apertures 256 through which a cable tie, yarn, or other flexible member can be threaded. The mounting bracket 254 also includes guide members 257 shaped to slidably receive a guide rail 280 of the housing 238 to hold the bracket 254 at the housing 238. A latch arm 282 disposed at a rear end of the guide rail 280 has a hook 282 configured to snap over a rear shoulder 258 of the aerial mounting bracket 254 to lock the bracket 254 to the housing 238. In certain examples, the bracket 254 includes a flange 259 that extends over the latch arm 282 when the bracket 254 is mounted to the housing 238 to inhibit depression of the latch arm 282. Accordingly, the flange 259 inhibits removal of the bracket 254 from the housing 238.

Figure 28:
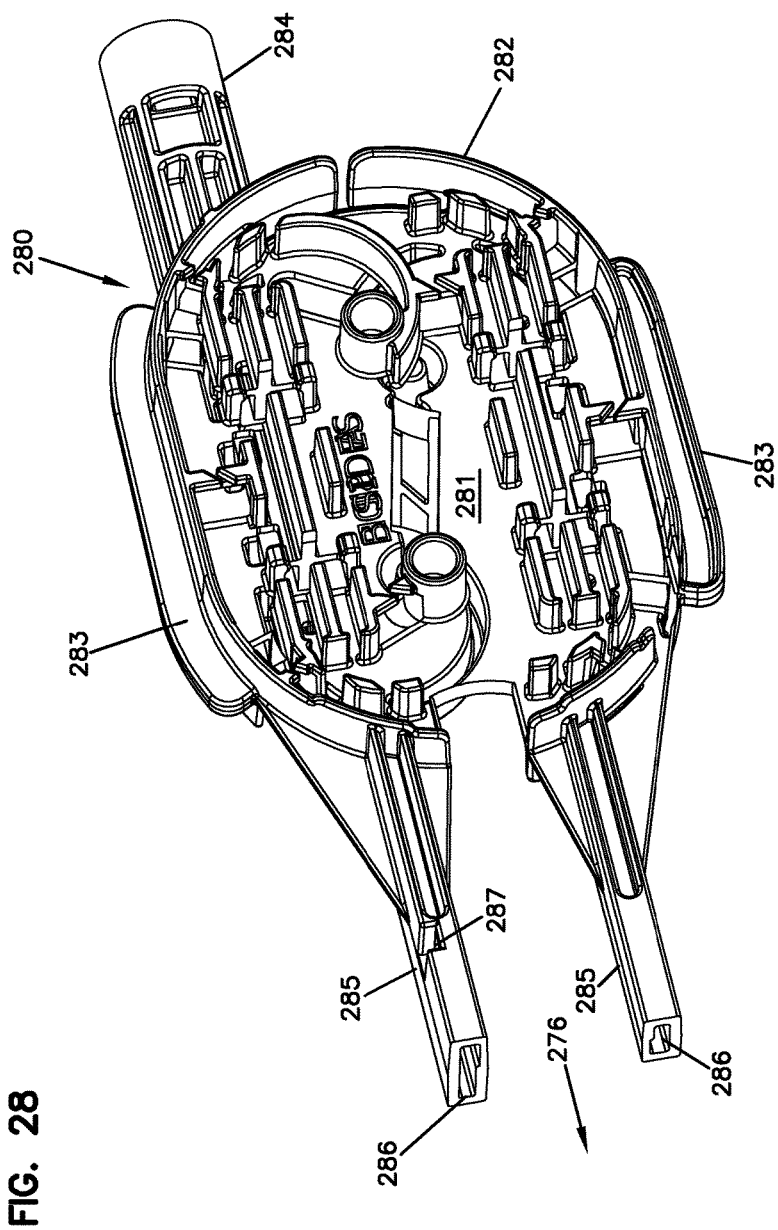
FIG. 28 is a perspective view of an example management arrangement of the management insert of FIG. 24.

In certain implementations, the indexing terminal 220 includes a management insert 260 disposed within the housing 238. For example, the housing 238 may be open at the second end 272 (see FIG. 24) to provide access to the housing interior. The management insert 260 can be configured to slide into the housing 238 through the open end. The management insert 260 includes a port arrangement 261 (FIGS. 26 and 27) and a management arrangement 280 (FIG. 28).

Optical lines of the multi-fiber cable 240 are routed through the management insert 260 to one of the ruggedized connection locations 222, 224, 226 for optical connection to a cable received thereat. First optical lines 251 extend to the first ruggedized connection location 222. In some implementations, the first optical lines 251 are indexed at the first ruggedized connection location 222.

At least one second optical line 242 is separated out from the first optical lines and routed to the second ruggedized connection location 224. In the example shown, another second optical line 242 also is separated out from the first optical lines and routed to the third ruggedized connection location 226. The first optical lines 251 terminate at a multi-fiber connector 244 that plugs into an interior port of the first ruggedized connection location 222. Each of the second optical lines 253 terminate at respective single-fiber connectors 243 that plug into interior ports of the second and third ruggedized connection locations 224, 226.

The port arrangement 261 includes an end wall 262 that defines openings 263 at which one or more optical adapters can be disposed to define the ruggedized connection locations 222, 224, 226. For example, a first optical adapter 265 can be mounted at one of the openings 263 of the end wall 262 to clamp a gasket 266 between a flange of the optical adapter 265 and the end wall 262. In the example shown, a washer 267 holds the first optical adapter at the end wall 262. The first optical adapter 265 defines the first ruggedized connection location 222. For example, the first optical adapter 265 includes an interior port for receiving the multi-fiber connector 244 and an exterior port for receiving an optical connector of another multi-fiber cable. The first optical adapter 265 includes a mounting section (e.g., threaded, bayonet-type, etc.) at the exterior port so that a multi-fiber connector of the another multi-fiber cable may be robustly connected.

In certain examples, second and optionally third optical adapters 268 also may be mounted to the end wall 262 at the other openings 263. The second and third optical adapters 268 have exterior ports defining the second and third ruggedized connection locations. Each of the second and third optical adapters 268 is configured to robustly receive a connector (e.g., a single-fiber connector) at the exterior port. Each optical adapter 268 also defines an interior port at which one of the single-fiber connectors 243 of the breakout fibers 242 is received. A respective gasket (e.g., O-ring) 266 may be provided between each of the optical adapters 268 and the end wall 262 to seal the interior of the housing 238 from environmental contamination. In certain examples, washers 267 may be threaded to the second and third optical adapters 268 to hold the second and third optical adapters 268 to the end wall 262.

The port arrangement 261 also includes ribs 269 extending outwardly from the end wall 262 in the second direction 276. The ribs 269 provide rotational keying for the optical adapters 265, 268 (see FIG. 26). A flange 271 extends outwardly from the end wall 262 in the first direction 274. The flange 271 provides a radially outwardly facing shoulder on which a gasket (e.g., an O-ring) can be mounted. The gasket environmentally seals the interior of the housing 238 when the port arrangement 261 is mounted at the open end 272 of the housing 238. In certain examples, the housing 238 defines a recessed channel 273 at the second end 272 in which the gasket can seat.

The port arrangement 261 is configured to mount to the management arrangement 280. In certain implementations, the port arrangement 261 includes one or more arms 275 extending outwardly from the end wall 262 in the first direction 274. In certain examples, a distal end of each arm 275 defines a respective hook 277. In examples, the hook 277 does not extend fully across a width of the respective arm 275. In the example shown in FIG. 18, the port arrangement 261 includes two arms 275 that have hooks 277 that face in opposite directions.

As shown in FIG. 28, the management arrangement 280 includes a base 281 partially surrounded by a peripheral wall 282. One or more legs 285 extend outwardly from the base 281 in the second direction 276. Each leg 285 defines a channel 286 sized to receive one of the latch arms 275 of the port arrangement 261. Each leg 285 defines an inner shoulder 287 or defines a sidewall slot that forms a shoulder 287 accessible from the channel 286. The hook 277 of each arm 275 snaps over the shoulder 287 to lock the management arrangement 280 to the port arrangement 261. In certain examples, each channel 286 has an enlarged axially extending section to accommodate the hook 277.

In certain implementations, keying flanges 283 extend radially outwardly from the peripheral wall 282 of the management arrangement 280. The keying flanges 283 are sized and configured to fit between guide ribs 239 defined within the housing 238. The guide ribs 239 and keying flanges 283 aid in guiding the management insert 260 within the housing 238.

In certain implementations, the management arrangement 280 includes a fiber guide member 284 extending in the first direction 274 from the base 281. The fiber guide member 284 is configured to align with the first multi-fiber ruggedized de-mateable connection location 250 when the management insert 260 is disposed within the housing 238. The fiber guide member 284 guides the optical fibers 241 of the multi-fiber cable 240 from the first multi-fiber ruggedized de-mateable connection location 250 to the base 281 of the management arrangement 280.

The management arrangement 280 is configured to organize the optical fibers defining the optical lines 251, 253. In some implementations, the optical lines 251, 253 are defined by the optical fibers 241 of the multi-fiber cable 240 and the optical fibers 241 are connectorized at the optical connectors 244, 243. In other implementations, the optical lines 251, 253 are defined by a combination of the optical fibers 241 and connectorized stub fibers as will be described in more detail herein.

Figure 29:
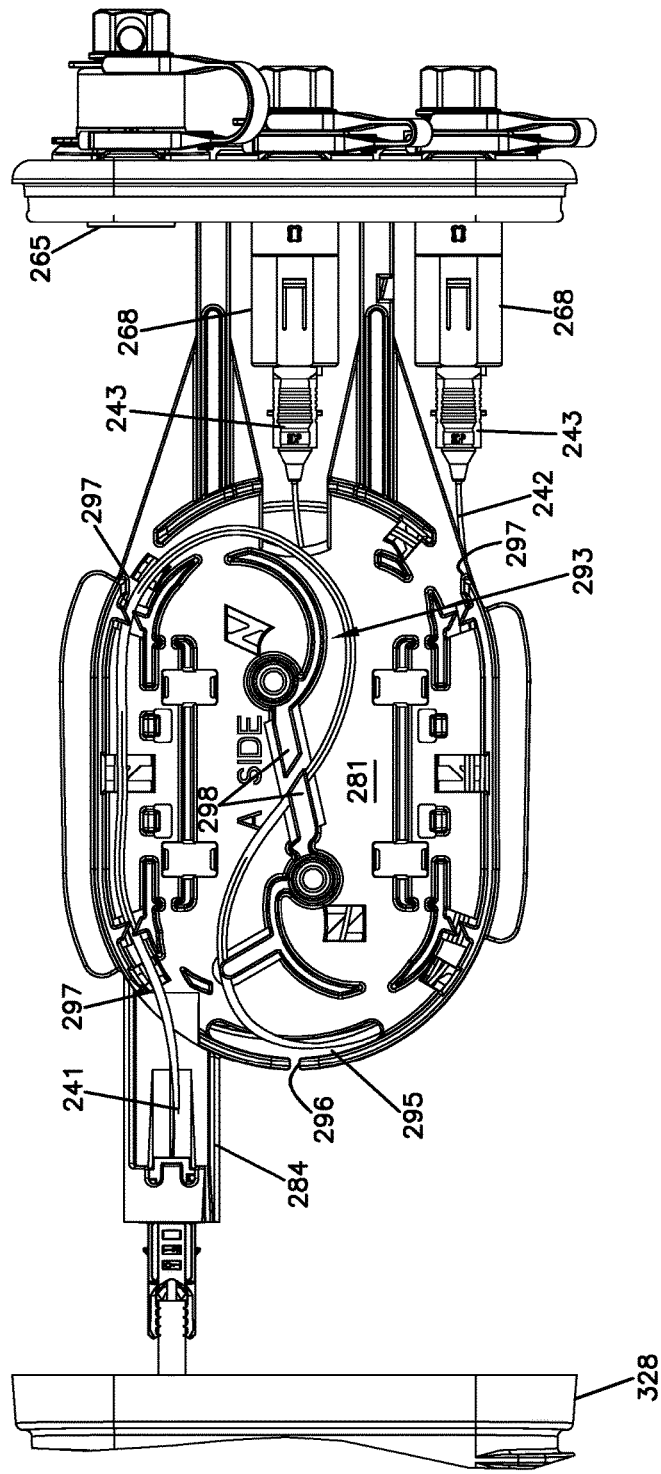
FIG. 29 is a first side view of the management insert of FIG. 24.
Figure 30:
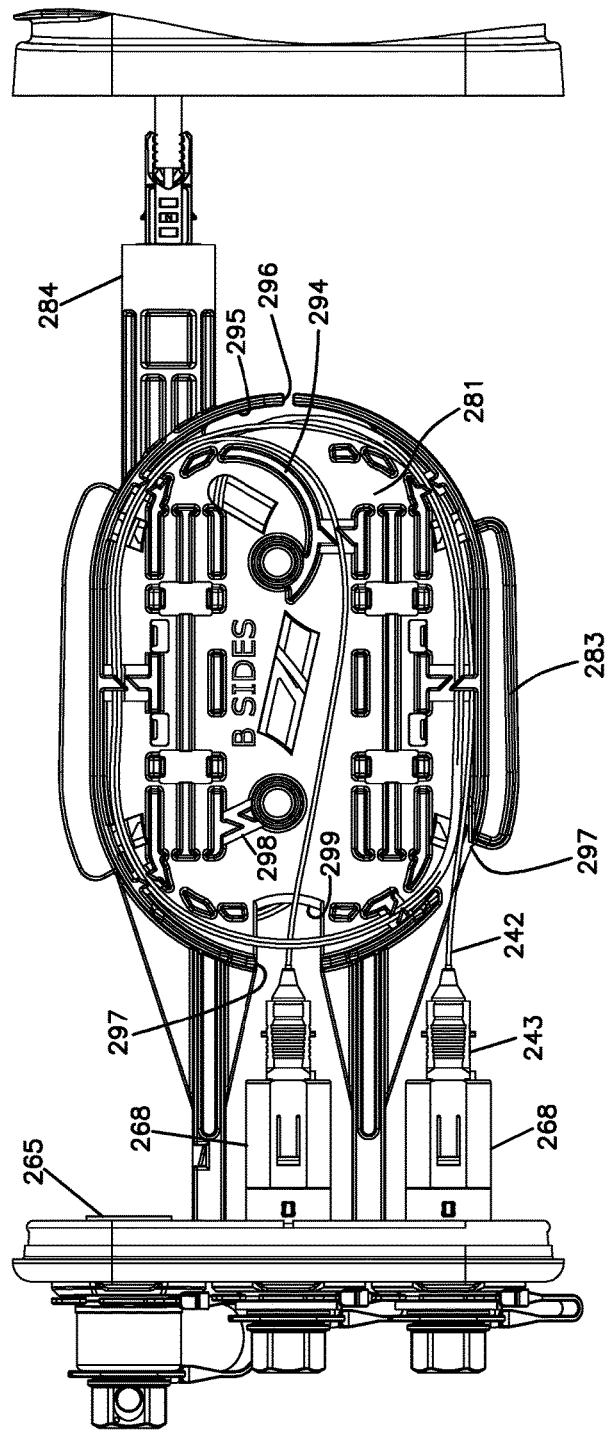
FIG. 30 is an opposite second side view of the management insert of FIG. 24.

Referring to FIGS. 29 and 30, the management arrangement 280 includes a first side tray 290 (FIG. 29) and an opposite second side tray 291 (FIG. 30). Each tray 290, 291 is defined by one side of the base 281 and one side of the peripheral wall 282. The base 281 also defines a transition slot 295 through which optical fibers can extend to transition the optical lines 251, 253 between the first and second side trays 290, 291. The peripheral wall 282 defines a slit 296 located at the transition slot 295 to aid in routing the fibers through the transition slot 295. The management arrangement 280 routes the optical lines 251 from the fiber guide 284, to the first side tray 290, and then to the port arrangement 261. The management arrangement 280 routes the optical lines 253 from the fiber guide 284, to the first side tray 290, to the second side tray 291, to the port arrangement 261.

Breaks 297 in the peripheral wall 282 enable the fibers to enter and exit the trays 290, 291. In some examples, the breaks 297 extend fully across both sides of the peripheral wall 282. In other examples, each break 297 is defined only at a respective side of the peripheral wall 282. For example, in certain implementations, breaks 297 are defined in the peripheral wall 282 of the first side tray 290 in alignment with the fiber guide member 284 and the first optical adapter 265 of the port arrangement 261 (see FIG. 29). In certain implementations, breaks 297 are defined in the peripheral wall 282 of the second side tray 291 in alignment with the second and third optical adapters 268 (see FIG. 30). In certain examples, the base 281 also can define an alignment slot 299 adjacent the second optical adapter 268 of the port arrangement 261. The alignment slot 299 allows the optical fiber plugged into the second optical adapter 268 to extend onto the second side tray 291 without overbending the optical fiber 242.

Each side tray 290, 291 includes a bend radius limiter arrangement 293, 294 that aids in routing optical fibers of the multi-fiber cable 240. The bend radius limiter arrangement 293 of the first side tray 290 routes the fibers 241 from the break 297 at the fiber guide member 284 towards the transition slot 295. In certain examples, the bend radius limiter arrangement 293 also is configured to hold slack length of the optical fibers. For example, the bend radius limiter 293 may route the slack length in a loop in either a clockwise or counter-clockwise direction. In certain examples, the bend radius limiter arrangement 293 also is configured to enable the fibers to transition between clockwise or counter-clockwise directional routing.

The bend radius limiter arrangement 294 of the second side tray 291 routes the optical fibers from the transition slot 295 towards the breaks 297 at the second and third optical adapters 268. In certain examples, the bend radius limiter arrangement 294 also is configured to hold slack length of the optical fibers. For example, the bend radius limiter arrangement 294 may route the slack length in a loop in either a clockwise or counter-clockwise direction.

In the example shown, each bend radius limiter arrangement 293, 294 includes outer limiter members and inner limiter members. The outer limiter members cooperate with the peripheral wall 282 to define outer routing pathways to hold the slack fiber loops. The inner limiter members enable routing of the optical fibers along a central region of the base 281. In the example shown in FIG. 29, the inner limiter members of the bend radius limiter arrangement 293 include a first limiter disposed closer to the fiber guide member 284 and facing in a first direction, a second limiter disposed closer to the port arrangement 261 and facing in a second direction, and retention arms 298 disposed between the first and second limiters. In the example shown in FIG. 30, the inner limiter members of the bend radius limiter arrangement 294 includes a limiter disposed at the fiber guide end of the second side tray 291 and retention arms 298 disposed at the port arrangement end of the second side tray 291.

FIGS. 29 and 30 show an example routing configuration for the optical lines 251, 253 used when the optical fibers 241 of the multi-fiber cable are connectorized and plugged into the interior ports of the port arrangement 261. As shown, the optical fibers 241 of the multi-fiber cable can be routed through the fiber guide 284, through a break 297 in the peripheral wall 282, and onto the base 281 at the first side 290 of the management arrangement 280. The fibers 241 are routed along part of the outer pathway defined by the peripheral wall 282 and the outer limiters of the bend radius limiter arrangement 293. In some examples, the fibers 241 are routed along the outer pathway until reaching the transition slot 295. In other examples, the fibers 241 are routed from the outer pathway to the inner limiters to change the direction. In the example shown in FIG. 29, the fibers are routed along the outer pathway of the first tray 290 in a clockwise direction and transition at the inner limiters to a counter-clockwise direction so that the fibers 241 pass through the transition slot 295 in the counter-clockwise direction.

The fibers 241 extend through the transition slot 295 to the second tray 291 and are routed part-way along the outer pathway defined by the peripheral wall 282 and the outer limiters of the bend radius limiter arrangement 294. In the example shown, one of the break-out fibers 242 is routed along the outer pathway to a break 297 in the peripheral wall 282 through which the fiber 242 extends to the port arrangement 261. The connectorized end 243 of the break-out fiber 242 is plugged into the interior port of one of the single-fiber optical adapters 268. Another of the break-out fibers 242 is routed from the outer pathway to the inner limiter and retention fingers 299, which direct the break-out fiber 242 to another break 297 in the peripheral wall 282 that aligns with the other single-fiber optical adapter 268 of the port arrangement 261. The connectorized end 243 of the other break-out fiber 242 is plugged into the interior port of the other single-fiber optical adapter 268.

Figure 31:
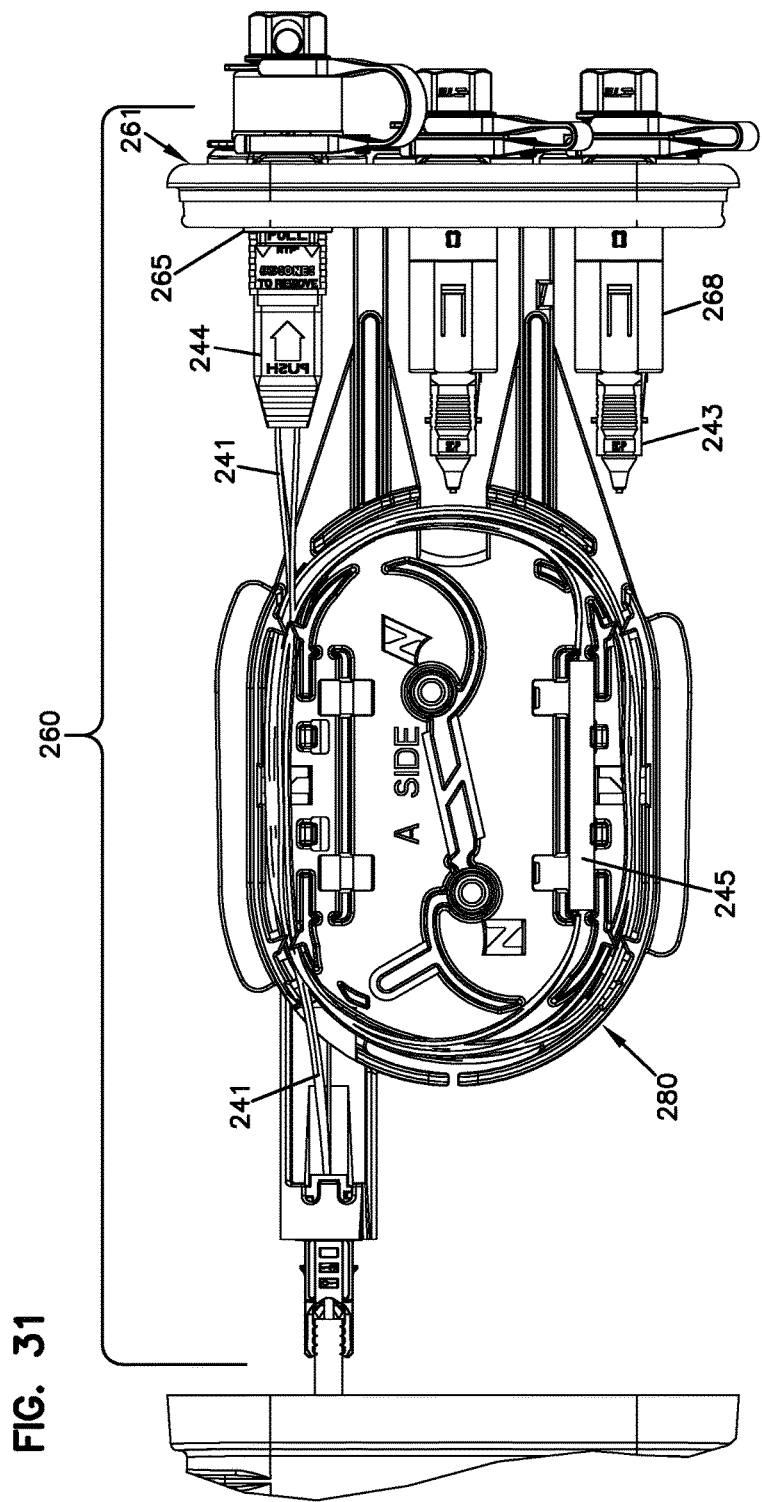
FIG. 31 is a first side view of the management insert of FIG. 24 using the first cabling scheme of FIG. 25.

FIG. 31 shows an alternative routing path for the optical lines 251, 253 from that shown in FIG. 22. In FIG. 31, the optical lines 251 are formed by both optical fibers 241 of the multi-fiber cable 240 and connectorized stub fibers 246 (see also FIG. 25). The optical fibers 241 are optically coupled to the stub fibers 246 by an optical splice (e.g., a mass-fusion splice, a mechanical splice, etc.). In the example shown, the optical fibers 241 are coupled to the stub fibers 246 using a mass fusions splice 245. The stub fibers are connectorized at the multi-fiber connector 244.

The first side tray 290 includes a splice region at which the mass fusion splice 245 can be disposed. The splice region includes structure configured to hold the mass fusion splice 245. For example, the structure can include latch fingers, compression-fit members, or other retention structure. In certain examples, the splice region is disposed between the outer pathway and the central region of the first splice tray 290. In certain examples, each management arrangement 280 is configured to hold a plurality of splices. For example, the first side tray 290 of each management arrangement 280 can include a plurality of (e.g., two) splice regions. In the example shown, the second splice region is spaced from the first splice region so that the inner members of the bend radius limiter arrangement 293 are disposed therebetween.

Figure 32:
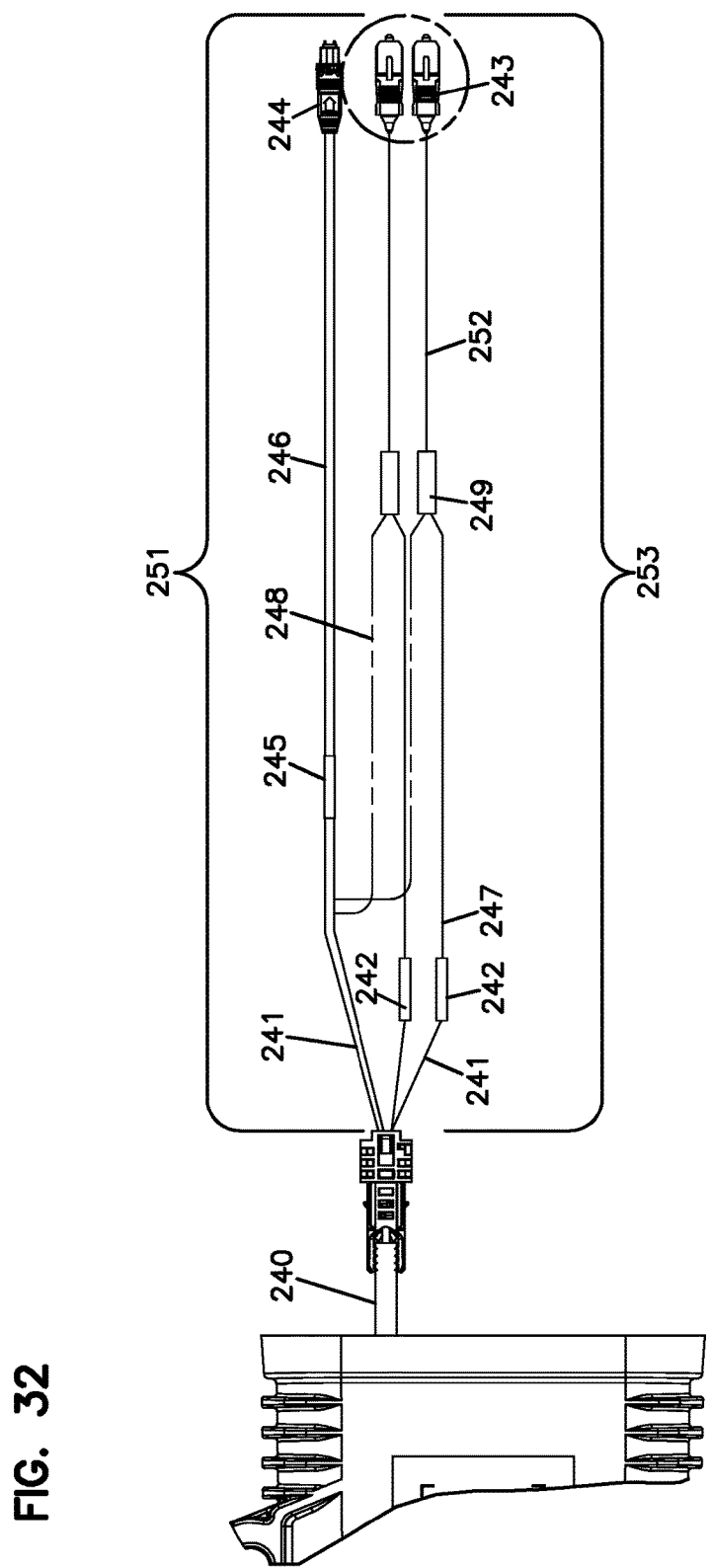
FIG. 32 illustrates a second cabling scheme that is similar to the first cabling scheme except that each of the two breakout fibers is combined with a respective intermediate fiber at an optical splitter from which a connectorized splitter output fiber extends.

Referring to FIG. 32, the breakout lines 253 also can be defined by multiple optical fibers. For example, one or more of the breakout lines 253 can be defined by an optical fiber 241 of the multi-fiber cable 240 optically coupled to a stub fiber 247 at an optical splice (e.g., mass-fusion splice) 245. In some implementations, the stub fiber 247 is connectorized at the single-fiber connector 243.

In other implementations, the cabling scheme is configured to support bi-directional indexing. The breakout lines 253 are configured to receive optical signals from either end of the network. For example, in certain implementations, the stub fiber 247 is combined with an intermediate fiber 248 at an optical splitter 249 so that any optical signals carried by either the stub fiber 247 or the intermediate fiber 248 are carried by a splitter output fiber 252. The splitter output fiber 252 is connectorized at a respective one of the single-fiber connectors 243. The intermediate fiber 248 is configured to receive optical signals from an opposite end of the network from the optical fibers 241. The term "splitter output fiber" is used for convenience and is not intended to imply a direction in which signals are carried over the optical lines 251, 253. Optical signals can be carried in either direction over the optical lines 251, 253.

For example, in certain implementations, the multi-fiber cable 240 has a particular number of fibers 241 and the connectorized stub fibers 246 include the same number of optical fibers. However, two of the cable fibers 241 are separated out instead of being directed to the mass fusion splice 245. Accordingly, there would be two connectorized stub fibers 246 unaligned with cable fibers 241. Each of these two connectorized stub fibers 246 can instead be aligned with one end of an intermediate fiber 248. An opposite end of the intermediate fiber 248 can be received at the optical splitter 249. Accordingly, the splitter output fiber 252 is configured to receive optical signals (e.g., from a central office) carried by the cable fiber 241 and optical signals (e.g., from another central office) carried by the corresponding stub fiber 246.

Figure 33:
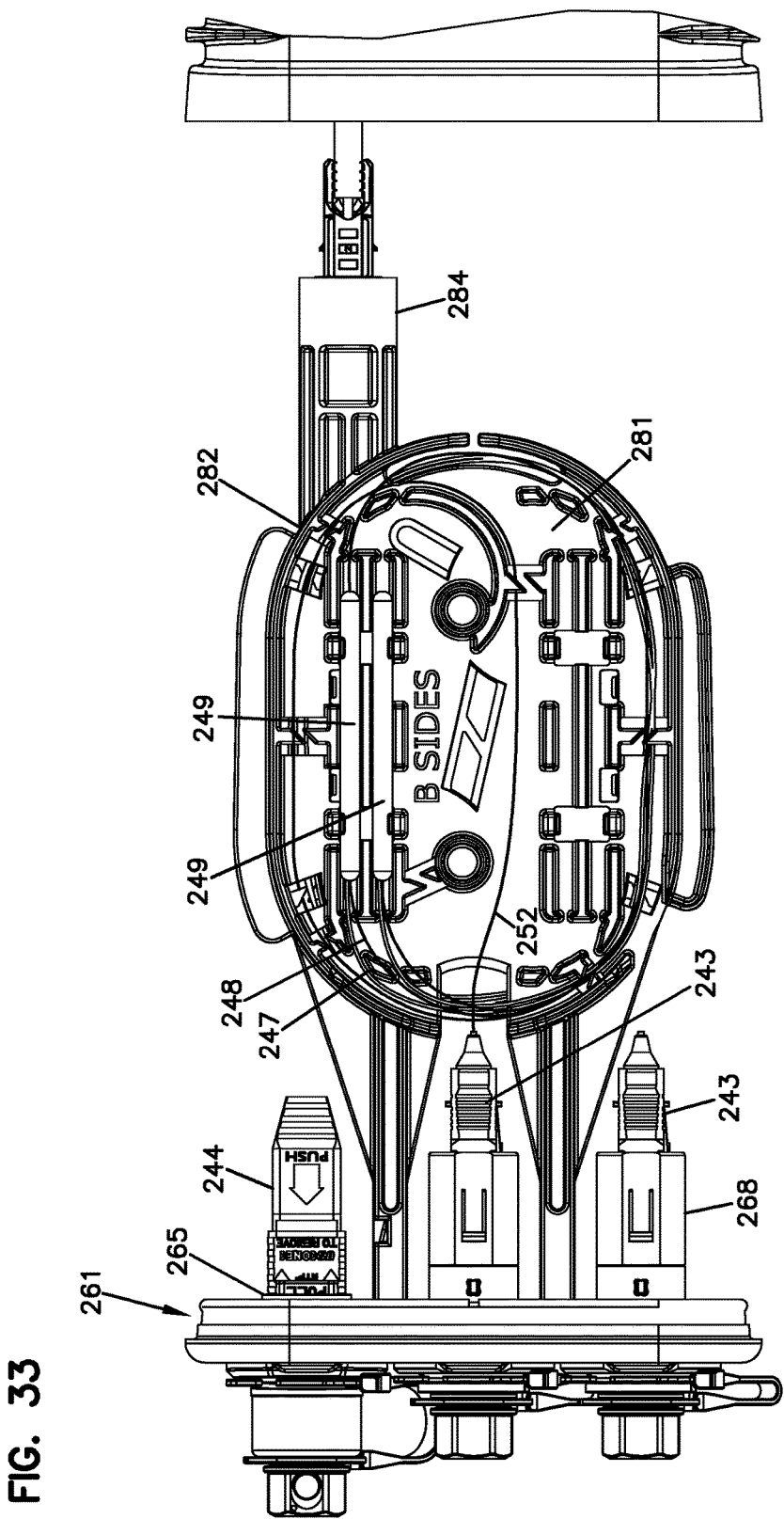
FIG. 33 is a second side view of the management insert of FIG. 24 using the second cabling scheme of FIG. 32.

FIG. 33 illustrates one example routing configuration for the fiber scheme shown in FIG. 32. The second side tray 291 is configured to hold one or more optical splices 249. In the example shown, the second side tray 291 holds two optical splices 249. In other examples, the second side tray 291 can hold one, three, four, or more optical splices 249. In the example shown, the two optical splices are located at a top of the central region. In other examples, the two optical splices can be located at a bottom of the central region. In still other examples, the optical splices 249 can be disposed at opposite sides of the central region.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. An indexing terminal comprising:
   a multi-fiber ruggedized de-mateable connection location, a first single-fiber ruggedized de-mateable connection location, and a second single-fiber ruggedized de-mateable connection location, the multi-fiber ruggedized de-mateable connection location including a plurality of fiber positions with one of the fiber positions optically coupled to the first single fiber ruggedized de-mateable connection location, wherein the multi-fiber ruggedized de-mateable connection location, the first single-fiber ruggedized de-mateable connection location and the second single-fiber ruggedized de-mateable connection location define port axes that are parallel; and
   a tether having a first end terminated by a ruggedized multi-fiber optical connector, the ruggedized multi-fiber optical connector having a plurality of fiber positions, one of the fiber positions being optically coupled to the second single-fiber ruggedized de-mateable connection location, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location.

2. The indexing terminal of claim 1, wherein the indexing terminal includes a housing defining a width corresponding to a insertion profile dimension of the housing, wherein the multi-fiber ruggedized de-mateable connection location defines an exterior port sized for receiving a ruggedized multi-fiber connector, and wherein the width of the housing is less than three times an inner diameter of the exterior port of the multi-fiber ruggedized de-mateable connection location.

3. The indexing terminal of claim 2, wherein the first and second single-fiber ruggedized de-mateable connection locations define exterior ports sized for receiving ruggedized single-fiber connectors, and wherein the width of the housing is less than four times an inner diameter of the exterior port of each of the first and second single-fiber ruggedized de-mateable connection locations.

4. The indexing terminal of claim 2, wherein the housing has opposite first and second ends, wherein the tether interfaces with the housing at the first end of the housing, and wherein the multi-fiber ruggedized de-mateable connection location, the first single-fiber ruggedized de-mateable connection location and the second single-fiber ruggedized de-mateable connection location are at the second end of the housing.

5. The indexing terminal of claim 2, wherein the housing is flexible.

6. The indexing terminal of claim 2, wherein the housing includes opposite major sides interconnected by a cylindrical wall, wherein the tether interfaces with the housing at the cylindrical wall, and wherein the multi-fiber ruggedized de-mateable connection location, the first single-fiber ruggedized de-mateable connection location and the second single-fiber ruggedized de-mateable connection location are at the cylindrical wall.

7. The indexing terminal of claim 1, wherein the multi-fiber ruggedized de-mateable connection location, the first single-fiber ruggedized de-mateable connection location and the second single-fiber ruggedized de-mateable connection location face in the same direction.

8. An indexing terminal comprising:
   a multi-fiber ruggedized de-mateable connection location, a first single-fiber ruggedized de-mateable connection location, and a second single-fiber ruggedized de-mateable connection location, the multi-fiber ruggedized de-mateable connection location including a plurality of fiber positions with one of the fiber positions optically coupled to the first single fiber ruggedized de-mateable connection location;

a tether having a first end terminated by a ruggedized multi-fiber optical connector, the ruggedized multi-fiber optical connector having a plurality of fiber positions, one of the fiber positions being optically coupled to the second single-fiber ruggedized de-mateable connection location, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location; and a housing defining a width corresponding to a insertion profile dimension of the housing, wherein the multi-fiber ruggedized de-mateable connection location defines an exterior port sized for receiving a ruggedized multi-fiber connector, and wherein the width of the housing is less than three times an inner diameter of the exterior port of the multi-fiber ruggedized de-mateable connection location, wherein the housing includes opposite major sides interconnected by a cylindrical wall, wherein the tether interfaces with the housing at the cylindrical wall, and wherein the multi-fiber ruggedized de-mateable connection location, the first single-fiber ruggedized de-mateable connection location and the second single-fiber ruggedized de-mateable connection location are at the cylindrical wall.

9. An indexing terminal comprising:

a housing having a length, a width, and a height that are all perpendicular to each other, the length being defined between opposite first and second end of the housing; and a plurality of ruggedized de-mateable connection locations carried by the first end of the housing, the plurality of ruggedized de-mateable connection locations including a first multi-fiber ruggedized de-mateable connection location having an exterior port, wherein the width of the housing is less than three times an inner diameter of the exterior port of the multi-fiber ruggedized de-mateable connection location.

10. The indexing terminal of claim 9, further comprising a second multi-fiber ruggedized de-mateable connection location that is optically coupled to the second end of the housing.

11. The indexing terminal of claim 10, wherein the second multi-fiber ruggedized de-mateable connection location is carried by the second end of the housing.

12. The indexing terminal of claim 10, further comprising a plurality of optical fibers extending within the housing and being indexed between the first and second multi-fiber ruggedized de-mateable connection locations.

13. The indexing terminal of claim 10, wherein the plurality of ruggedized de-mateable connection locations includes a single-fiber ruggedized de-mateable connection location that is disposed at the first end.

14. The indexing terminal of claim 13, further comprising:

a plurality of optical fibers extending within the housing and being indexed between the first and second multi-fiber ruggedized de-mateable connection locations; and an optical drop fiber extending within the housing between the first multi-fiber ruggedized de-mateable connection location and the single-fiber ruggedized de-mateable connection location.

15. The indexing terminal of claim 13, wherein the single-fiber ruggedized de-mateable connection location is a first single-fiber ruggedized de-mateable connection location; and wherein the plurality of ruggedized de-mateable connection locations also includes a second single-fiber ruggedized de-mateable connection location that is disposed at the first end.

16. The indexing terminal of claim 15, wherein the first multi-fiber ruggedized de-mateable connection location, the first single-fiber ruggedized de-mateable connection location, and the second single-fiber ruggedized de-mateable connection location are laterally aligned in a row.

17. An indexing terminal comprising:

a multi-fiber ruggedized de-mateable connection location, a first single-fiber ruggedized de-mateable connection location, and a second single-fiber ruggedized de-mateable connection location, the multi-fiber ruggedized de-mateable connection location including a plurality of fiber positions with one of the fiber positions optically coupled to the first single fiber ruggedized de-mateable connection location, wherein the multi-fiber ruggedized de-mateable connection location, the first single-fiber ruggedized de-mateable connection location and the second single-fiber ruggedized de-mateable connection location face in the same direction; and a tether having a first end terminated by a ruggedized multi-fiber optical connector, the ruggedized multi-fiber optical connector having a plurality of fiber positions, one of the fiber positions being optically coupled to the second single-fiber ruggedized de-mateable connection location, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location.

18. The indexing terminal of claim 17, wherein the indexing terminal includes a housing defining a width corresponding to a insertion profile dimension of the housing, wherein the multi-fiber ruggedized de-mateable connection location defines an exterior port sized for receiving a ruggedized multi-fiber connector, and wherein the width of the housing is less than three times an inner diameter of the exterior port of the multi-fiber ruggedized de-mateable connection location.

19. The indexing terminal of claim 18, wherein the first and second single-fiber ruggedized de-mateable connection locations define exterior ports sized for receiving ruggedized single-fiber connectors, and wherein the width of the housing is less than four times an inner diameter of the exterior port of each of the first and second single-fiber ruggedized de-mateable connection locations.

20. The indexing terminal of claim 18, wherein the housing has opposite first and second ends, wherein the tether interfaces with the housing at the first end of the housing, and wherein the multi-fiber ruggedized de-mateable connection location, the first single-fiber ruggedized de-mateable connection location and the second single-fiber ruggedized de-mateable connection location are at the second end of the housing.

21. The indexing terminal of claim 18, wherein the housing is flexible.

22. An indexing terminal comprising:

a multi-fiber ruggedized de-mateable connection location, a first single-fiber ruggedized de-mateable connection location, and a second single-fiber ruggedized de-mateable connection location, the multi-fiber ruggedized de-mateable connection location including a plurality of fiber positions with one of the fiber positions optically coupled to the first single fiber ruggedized de-mateable connection location;

a tether having a first end terminated by a ruggedized multi-fiber optical connector, the ruggedized multi-fiber optical connector having a plurality of fiber positions, one of the fiber positions being optically coupled to the second single-fiber ruggedized de-mateable connection location, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location; and a housing defining a width corresponding to an insertion profile dimension of the housing, wherein the multi-fiber ruggedized de-mateable connection location defines an exterior port sized for receiving a ruggedized multi-fiber connector, and wherein the width of the housing is less than three times an inner diameter of the exterior port of the multi-fiber ruggedized de-mateable connection location, wherein the housing has opposite first and second ends, wherein the tether interfaces with the housing at the first end of the housing, and wherein the multi-fiber ruggedized de-mateable connection location, the first single-fiber ruggedized de-mateable connection location and the second single-fiber ruggedized de-mateable connection location are at the second end of the housing.

23. The indexing terminal of claim 22, wherein the housing also has a length and a height, the height being at least 3 times as long as the width and the length being at least 4 times as long as the width; and the ruggedized de-mateable connection locations define ports having port axes, the port axes being included in a common plane that extends along the height of the housing and that bisects the housing, and the first single fiber ruggedized de-mateable connection location defining an exterior port, wherein the width of the housing is less than four times an inner diameter of the exterior port.

24. The indexing terminal of claim 23, wherein the ruggedized de-mateable connection locations face in a common direction.

* * * * *